(12) United States Patent
McGinty

(10) Patent No.: US 11,711,049 B2
(45) Date of Patent: Jul. 25, 2023

(54) SOLAR TRACKING SYSTEM FOR A RECREATIONAL VEHICLE

(71) Applicant: JBC Technologies, LLC, Madison, AL (US)

(72) Inventor: Joseph Ralph McGinty, Madison, AL (US)

(73) Assignee: JBC Technologies, LLC, Huntsville, AL (US)

( * ) Notice: Subject to any disclaimer, the term of this patent is extended or adjusted under 35 U.S.C. 154(b) by 16 days.

(21) Appl. No.: 16/792,220

(22) Filed: Feb. 15, 2020

(65) Prior Publication Data

US 2020/0321909 A1 Oct. 8, 2020

Related U.S. Application Data

(60) Provisional application No. 62/827,963, filed on Apr. 2, 2019.

(51) Int. Cl.
*H02S 20/32* (2014.01)
*B60L 8/00* (2006.01)
*H02S 30/10* (2014.01)
*H02S 10/40* (2014.01)

(52) U.S. Cl.
CPC .............. *H02S 20/32* (2014.12); *B60L 8/003* (2013.01); *H02S 10/40* (2014.12); *H02S 30/10* (2014.12)

(58) Field of Classification Search
CPC .......... H02S 20/32; H02S 10/40; H02S 30/10; B60L 53/51; B60L 8/003
See application file for complete search history.

(56) References Cited

U.S. PATENT DOCUMENTS

| | | | |
|---|---|---|---|
| 7,202,457 B2* | 4/2007 | Janus | H02S 20/32 250/203.4 |
| 2009/0165841 A1* | 7/2009 | Gunn, Jr. | H02S 20/00 136/245 |
| 2010/0307479 A1* | 12/2010 | Park | H02S 20/00 126/601 |
| 2011/0120523 A1* | 5/2011 | Silver | H02S 20/32 136/246 |
| 2012/0125401 A1* | 5/2012 | DeVillier | F24S 50/20 136/246 |
| 2016/0020727 A1* | 1/2016 | Cheung | H02S 20/30 136/245 |
| 2021/0044251 A1* | 2/2021 | Searcy | H02S 20/32 |

* cited by examiner

*Primary Examiner* — Mayla Gonzalez Ramos
(74) *Attorney, Agent, or Firm* — Dennen IP Law, LLC

(57) ABSTRACT

The present disclosure is a lightweight, portable solar tracker assembly that has a bottom frame coupled to a rotation drive disc coupled to a rotational linear actuator and a middle frame rotatably coupled to the bottom frame via the rotation drive disc such that when activated, the middle frame rotates. The assembly further has a solar array mounting frame coupled to the middle frame and comprising a vertical linear actuator coupled to the middle frame such than when activated, the solar array mounting frame moves vertically, and when the middle frame rotates, the solar array mounting frame rotates and at least one solar cell fixedly coupled to the solar array mounting frame. In addition, the assembly has a processor configured to determine a position in a sky of a sun, actuate the vertical linear actuator and the rotational linear actuator so that the at least one solar cell is aligned with the sun.

24 Claims, 20 Drawing Sheets

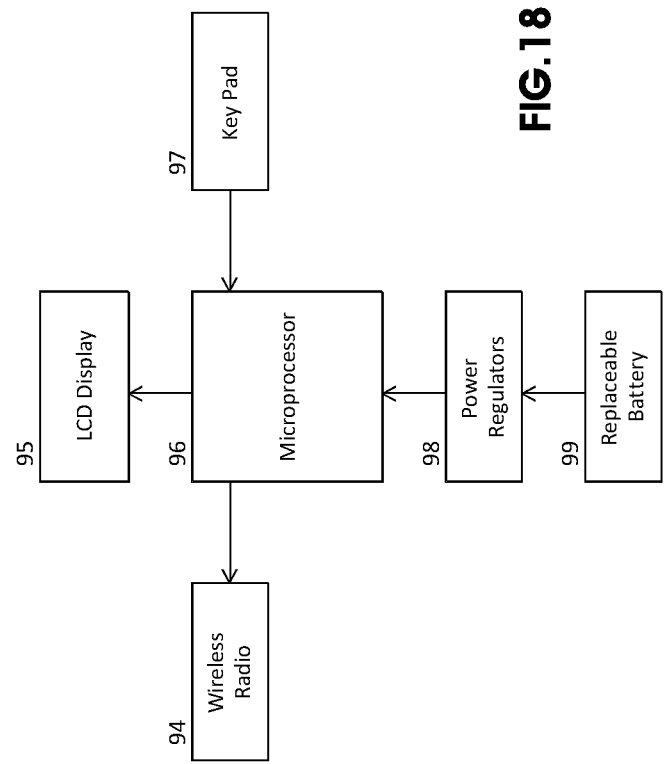

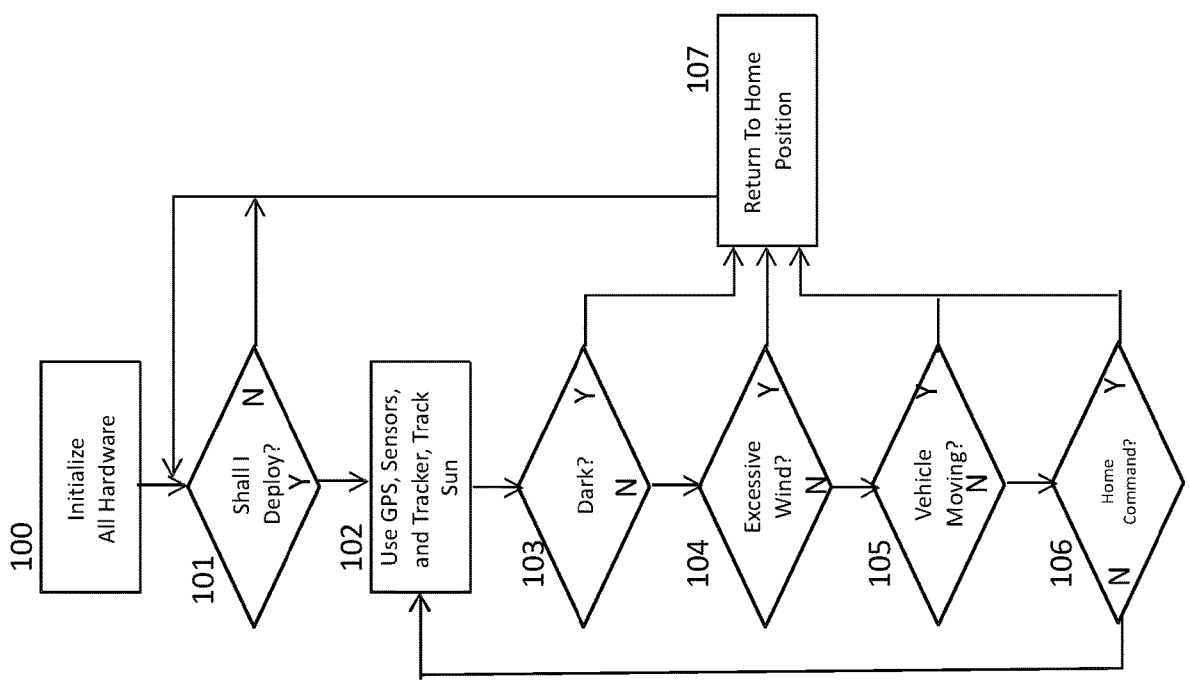

SOLAR TRACKING SYSTEM FOR A RECREATIONAL VEHICLE

CROSS-REFERENCE TO RELATED APPLICATION

This application claims priority to Provisional Patent Application Ser. No. 62/827,963 entitled Solar Tracking System for RV filed Apr. 2, 2019, which is incorporated herein by reference.

BACKGROUND

Modern RV's are used for many purposes, for travel, overnight parking in campgrounds, and off road, off the grid camping in isolated areas such as forests, lakes, and beaches. Many modern RVs are currently being outfitted with solar panels to augment the charging of the RV internal batteries, for use during the day directly from the solar power, and at night for powering various appliances from the batteries within the RV. This presents issues that are not present on fixed home or commercial solar cell installations. Many companies mount solar cell arrays on the top or RVs, most of them are flat and cannot be moved to track the sun for maximum efficiency for use and charging of batteries. Though solar trackers have been in use for many years, they are usually large and heavy with very strong and powerful motion mechanisms that use a large amount of electrical power to move.

In addition, most solar trackers are pedestal mounted cells requiring counterweights and very heavy, strong motion mechanisms to move them and stand up to the wind. Of course, on RVs, the solar tracker must be able to survive highway speeds plus the addition of any headwinds encountered. This leads to a requirement for a light weight, strong, and safe solar tracker that has the ability to retract or fold down and lock to greatly reduce the wind loading and to provide safety when the RV vehicle is in transport on the highway. Additionally, with modern electronics controlling the solar tracker, all required operations will be automated to ensure the operation is convenient and safe for the users.

DESCRIPTION OF DRAWINGS

FIG. 18 is an exemplary interface system of the sun tracker assembly of FIG. 1.

FIG. 19 is a flowchart of the architecture and functionality of the master controller of FIG. 16.

DESCRIPTION

Figure 1:
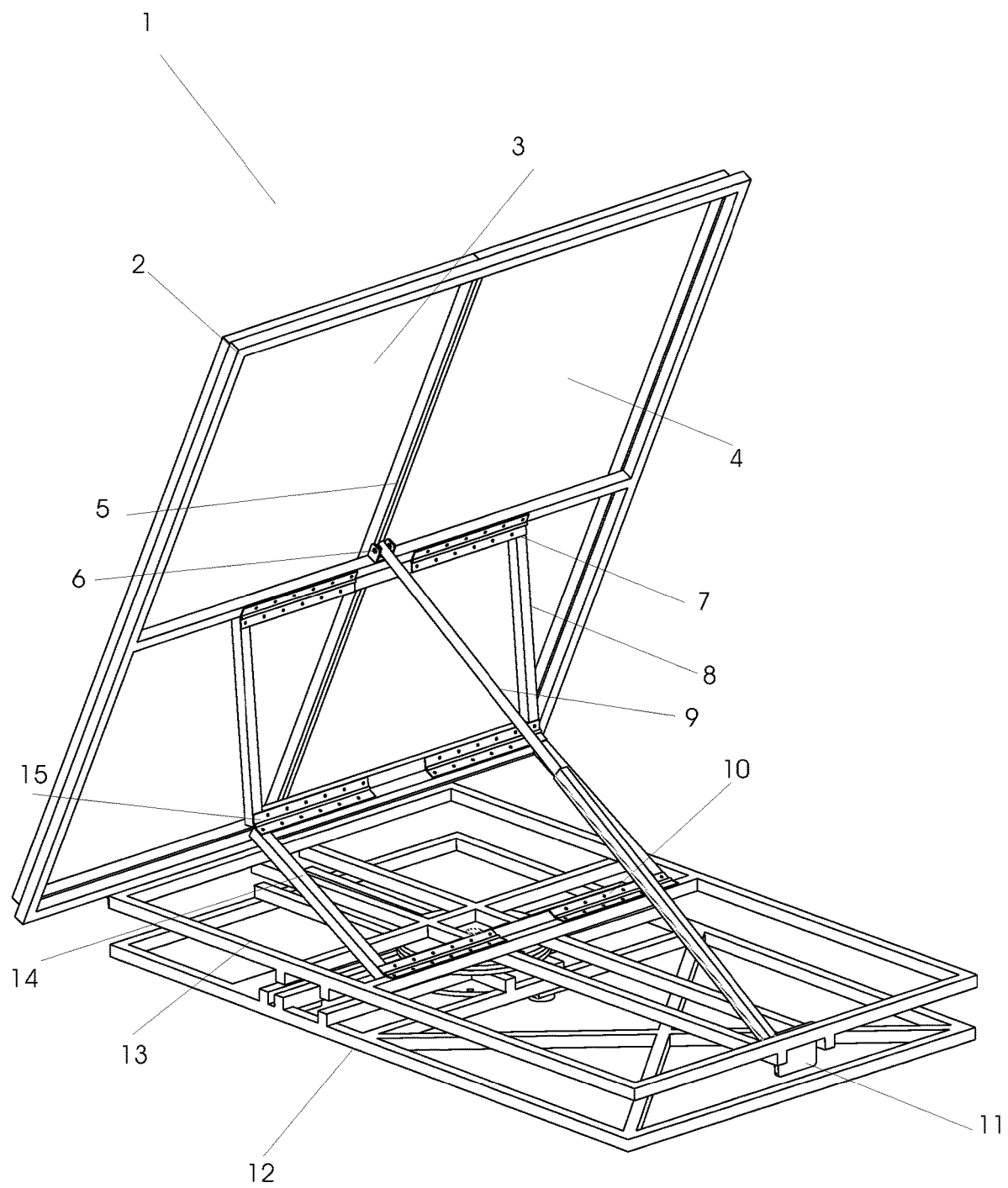
FIG. 1 is rear perspective view of an exemplary, deployed solar tracker assembly in accordance with an embodiment of the present disclosure.

According to the present disclosure there is disclosed a solar tracker assembly comprised of frames, actuators, sensors, and hinges that is lightweight, strong, and can retract or fold down. The solar tracker assembly may be used on any structure or vehicle, such as a residence or a recreational vehicle (RV). The solar tracker assembly withstands vehicle highway speeds for use on RVs and related vehicles, or any other use where light weight and ability to withstand winds is required. Further, the solar tracker assembly may be installed on a roof of a building, e.g., a residence building or a commercial building.

The present disclosure is a portable solar tracker assembly that automatically aligns a solar cell panel array mounted on a structure, which tracks the sun during the day at maximum efficiency. In one embodiment, the portable sun tracker assembly is lightweight, retracts or folds down for minimum wind resistance when implemented on the structure, and is robust to stand up to winds when deployed at a campsite on an RV.

The portable solar tracker assembly is mounted on a top or other location of a structure. For example, it may be mounted on a roof of a residence or on a roof of an RV. The solar tracker assembly comprises one or more solar panels for receiving light energy and the controller for converting the light energy into a flow of electricity.

The portable solar tracker assembly can be used on most structures or vehicles, e.g., an RV. In regard to RVs, RVs come in several different categories. As described, the solar tracker assembly can be utilized by all of the categories of RVs listed below and the term "Recreational Vehicle" or RV is interchangeable for all of the vehicles using the portable solar tracker assembly. The types of vehicles include, but are not limited to the following:
1. Class A Motorhome
2. Bus Conversion 3. Class B Motorhome (Campervan)
4. Class C Motorhome
5. Truck Camper
6. Popup Camper
7. Travel Trailer
8. Teardrop Trailer
9. Hybrid Trailer
10. Fifth-Wheel Trailer
11. Park Model (vacation/resort cottage)

The portable solar tracker assembly is stored flat when not in use. For example, if the solar tracker assembly is mounted on an RV, it is stored flat during travel on the road. As another example, if the solar tracker assembly is mounted on a roof and it's a cloudy day, the solar tracker assembly is stored flat until the solar tracker assembly detects solar irradiation.

In one embodiment, the solar tracker assembly is deployed when the RV is parked or when there is sunlight present on the top of a residence. When deployed, the solar tracker assembly is positioned such that solar panels are aimed directly toward the sun. Note that in one embodiment, two solar panels are used; however, more or fewer solar panels may be used in other embodiments.

Once positioned, the portable solar tracker assembly tracks the sun at its different position during the daylight hours by automatically orienting the solar panels toward the sun as the sun traverses the sky. The solar energy produced provides maximum efficiency for immediate use of energy in the RV or residence and charging of batteries for later use in the RV or residence. The solar tracker assembly also automatically stores itself during the night hours, periods of high wind conditions, and movement of the host vehicle.

The solar tracker assembly further comprises an electronic controller and battery to control and operate movement of the solar panels. In one embodiment, the solar tracker assembly may be controlled and monitored by the user using a small battery powered unit that can be mobile or mounted inside the RV, typically on a wall or bulkhead. The unit may be, for example, a cellular device, a laptop, or a personal computer.

In one embodiment, the sun tracker assembly provides a solar tracking system suitable for use on recreational vehicles of all types that can retract and fold down for highway transition, deploy and automatically track the sun and sense winds and vehicle speed to automatically fold down.

In another embodiment, the sun tracker assembly is made of lightweight material and does not require very heavy gimbal mechanisms and high-powered motors and gears for wind resistance and operation.

In addition, the sun tracker assembly uses minimal power to move the solar cells.

Also, the sun tracker assembly is low cost to manufacture.

The sun tracker assembly is also robust in regards to surface winds encountered when deployed, can sense the presence of high winds and automatically retract and fold down for protection.

The sun tracker assembly is compact and low wind resistance in the retracted folded down highway configuration.

The sun tracker assembly contains sensors and actuators monitored and controlled by an electronic controller to automate required functions.

The sun tracker assembly has remote control capability with a user interface for status, messaging, and control.

The sun tracker assembly also is scalable to many different types of RVs and homes and a variety of solar panels.

The sun tracker assembly further contains an optical sun tracker that is robust, easily cleaned and provides signal for accurately tracking the sun as it moves across the sky.

The sun tracker assembly is also self-contained and comprises electronics and software to control the operation of the components of the sun tracker assembly.

FIG. 1 is a back-perspective view of a solar tracker assembly 1 in accordance with an embodiment of the present disclosure. FIG. 1 depicts the solar tracker assembly 1 in the vertically deployed position. The vertically deployed position means that solar cells are vertically extended upward such that solar cells 3 and 4 are facing the sun for maximum absorption of the energy from the sun.

The solar tracking 1 comprises at least three aluminum frames including a bottom frame 12, a middle frame 13, and a solar array mounting frame 2. Bottom Frame 12 is the base frame of the system. It has all the elements to hold and support the solar tracker assembly 1. The bottom frame 12 further mounts the solar tracker assembly 1 to an RV or roof directly or by using adapter mechanisms. The middle frame 13 connects with the bottom frame 12 via a rotational joint system (not shown).

The middle frame 13 is rotatably coupled to the bottom frame, and the middle frame 13 is fixedly coupled to a solar array mounting frame 2, which holds solar cells 3 and 4. In this regard, the bottom frame 12 is fixedly coupled to the house or vehicle, and the middle frame 13 rotates in accordance with signals received from a master controller, which is described further herein.

Note that the solar array mounting frame 2 is constructed of aluminum or any other light metal to customer fit a solar cell 3 and a solar cell 4. However, other types of materials may be used in other embodiments. Further, solar cell 3 and 4 are standard commercial solar arrays consisting of many solar cells arranged to provide voltage and current when the solar cells 3 and 4 are in contact with the sun.

The solar tracker assembly 1 further comprises an upper stabilizer frame 8 and a lower stabilizer frame 14. Note that the lower stabilizer frame 14 is a structural device to stabilize the deployed sun tracker assembly 1 when wind is blowing on the parked RV or on the residence. The upper stabilizer frame 8 and the lower stabilizer frame 14 are attached to a solar array frame 5 using top vertical stabilizer hinge 7. The upper stabilizer frame 8 is a structural device to stabilize the deployed sun tracker assembly 1 when wind is blowing on the parked RV or on the residence.

Note that solar array frame 5 is a reinforcing frame to hold solar cell 3 and solar cell 4 together. Further note that the top vertical stabilizer hinge 7 is a long distributed hinge commonly referred to as a piano hinge. The upper stabilizer frame 8 attaches to lower stabilizer frame 14 using a middle vertical stabilizer hinge 15. Middle vertical stabilizer hinge 15 is a long, distributed hinge commonly referred to as a piano hinge. This enables the sun tracker assembly to flatten and be in an un-deployed position, when needed.

Lower stabilizer frame 14 attaches to middle frame 13 using a bottom vertical stabilizer hinge 10. Note that the bottom vertical stabilizer hinge 10 is a long, distributed hinge commonly referred to as a piano hinge, and it is permanently attached to connect solar array mounting frame 2 and middle frame 13 together. The stabilizer frames 8 and 14 are hinged so that they can move in the tilt plane, but they are stiff in the horizontal plane. Their purpose is to stabilize solar array mounting frame 2 in windy conditions by preventing lateral motion of solar array mounting frame 2.

Further, the solar tracker assembly 1 comprises a vertical linear actuator 9. Note that the vertical linear actuator 9 is a commercially available linear actuator with a motor and a drive to lift or tilt the solar cells 3 and 4 in the vertical direction, as commanded by the master controller, which is described further here.

The vertical linear actuator 9 is attached to the solar array mounting frame 2 via a vertical linear actuator attachment bracket 6, and the vertical linear actuator 9 is attached to bottom frame 12 via a vertical linear actuator lower bracket 11 that is welded to the bottom frame 12.

The tilt angle of the solar array mounting frame 2 is controlled by the extension and retraction of the vertical linear actuator 9, as commanded by the master controller, which is described further herein.

In one embodiment, the maximum tilt angle is approximately 75 degrees to align with the sun on the horizon in the early morning and late afternoon. Since solar cell 4 and solar cell 3 are attached permanently to Solar Array Mounting Frame 2, they are also tilted simultaneously therewith, such that the solar cell 4 and solar cell 3 align with the angle of the sun during the day. In one embodiment, vertical linear actuator attachment bracket 6 attaches to solar array frame 5 for added strength.

During operation, the master controller (not shown), which is described further herein, continually or periodically monitors a position of the sun relative to the solar cell 4 and the solar cell 3. After a pre-determined time, the controller determines an approximate location of the sun and rotates the middle frame 13 so that the solar cell 4 and solar cell 3 align with the sun. In this regard, the middle frame 13 is fixedly coupled to the solar array mounting frame 2, so when the middle frame 13 rotates the solar cell 4 and the solar cell 3 rotate with the middle frame 13.

In one embodiment, the master controller may also manipulate the tilt of the solar cell 3 and solar cell 4 via the vertical linear actuator 9. Rotating the solar cell 4 and the solar cell 3 and adjusting the tilt of the solar cell 4 and the solar cell 3 periodically ensures that throughout the day the energy output of the solar tracker assembly 1 is maximized by maximizing the solar cells' exposure to the sun.

Figure 2:
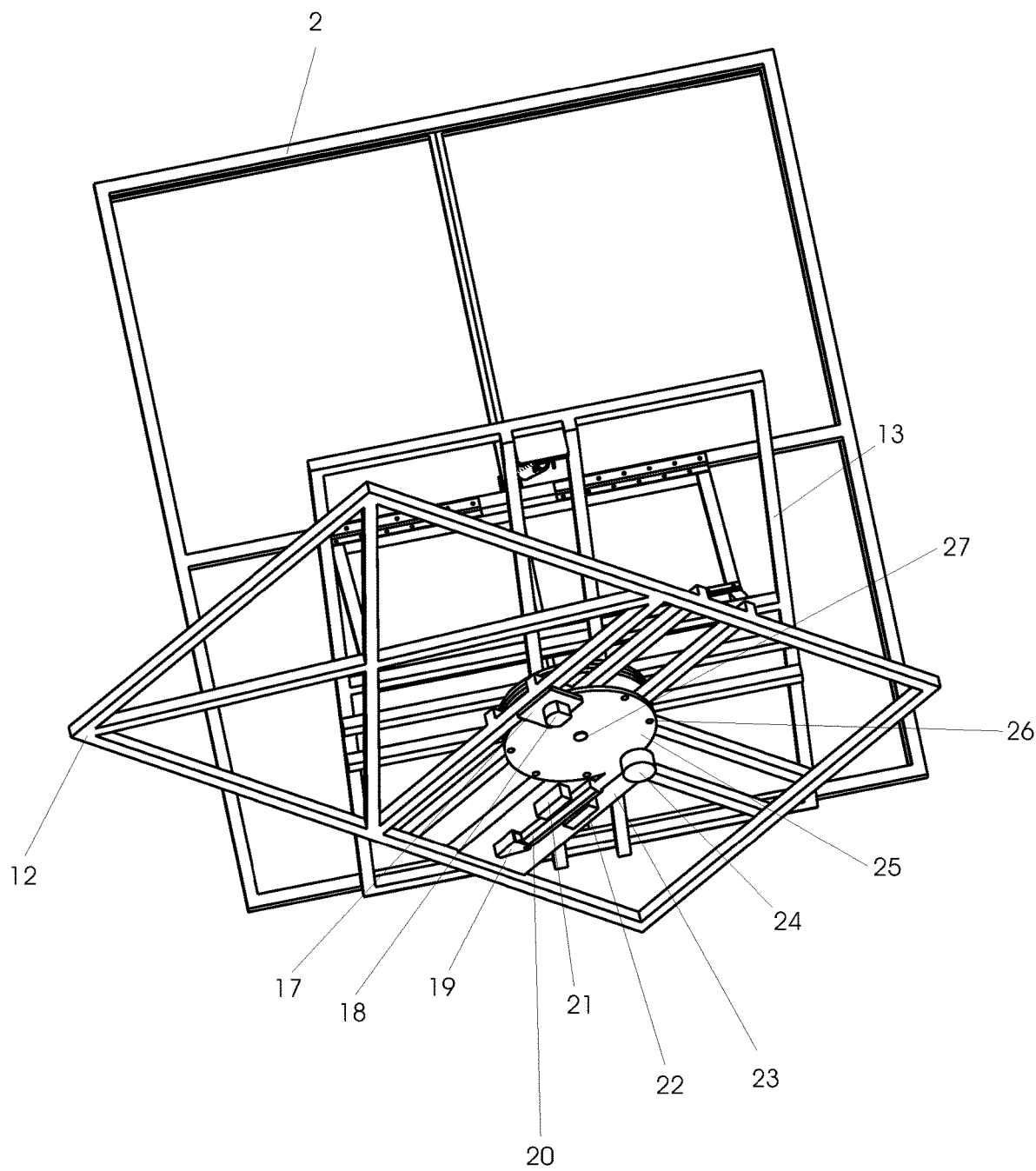
FIG. 2 is a bottom perspective view of the deployed solar tracker assembly of FIG. 1.

FIG. 2 is a bottom perspective view of the solar tracker assembly 1. The solar tracker assembly 1 further comprises a rotation drive disc 25 coupled to the bottom frame 12. The rotation drive disc 25 comprises retention holes 26 around the outside edge of the rotation drive disc 25. The rotation drive disc 25 is a metal disc that is attached to the middle frame 13 via rotation elements that rotate middle frame 13 when moved by a rotational linear actuator 20, described further herein.

Coupled to the rotation drive disc 25 is an actuator locking pin 24, which is coupled to a rotational actuator mounting plate 23. Note that the rotational actuator mounting plate 23 may be welded to the bottom frame 12 for mounting the rotational linear actuator 20 and other support elements as described.

The actuator locking pin 24 is inserted in one of the retention holes 26. Notably, actuator locking pin 24 is an electrically activated locking pin, which is activated via a solenoid or an actuator. When activated, the actuator locking pin 24 retracts from the retention hole 26 in which it is inserted, moves to the next retention hole position, i.e., a next retention hole 26, and inserts in the next retention hole 26. The repetitious activation of the actuator locking pin 24 provides for rotation of the middle frame 13, which also rotates the solar array mounting frame 2.

Note that coupled to the rotational actuator mounting plate 23 is a rotational linear actuator 20. The rotational linear actuator 20 is coupled to a rotational linear actuator bracket 19, which affixes the rotational linear actuator 20 to the bottom frame 12. The rotational linear actuator bracket 19 is a bracket to mount linear actuator 20 onto rotational actuator mounting plate 23. Further, rotational linear actuator 9 is a commercially available linear actuator with motor and drive to lift the solar cells 3 and 4 assembly in the vertical direction. Further, there are two stops, an inside stop 21 and an outside stop 22 coupled to the rotational linear actuator bracket 19, so that the rotational linear actuator 20 is held by the inside stop 21 and the outside stop 22. The stops 21 and 22 prevent undue rotation while in operation. These stops may be fixed, or spring loaded. The stops 21 and 22 are mechanical stops that prevent the rotation of rotational linear actuator 20 beyond specified limits.

There is a fixed locking pin 18 affixed to the rotation drive disc 25 via a fixed locking pin mount 17. Fixed locking pin mount 17 provides a fixed position mounting plate to mount fixed locking pin 18. Fixed Locking Pin 18 is electrically activated via solenoid or actuator. When activated, the fixed locking pin 18 is removed from locking rotation drive disc 25, allowing rotation drive disc 25 to be moved to the next position, and fixed locking pin 18 will be returned to lock rotation drive disc 25 after rotation to prevent further undesirable rotation.

Thus, the bottom frame 12 contains the rotational elements required to rotate solar array mounting frame 2. The rotation drive disc 25 rotates middle frame 13 using the rotational linear actuator 20.

Rotational linear actuator 20 uses the combination of a fixed locking pin 18 and an actuator locking pin 24 to rotate middle frame 13. In one embodiment, there are eight or more retention holes 26 in rotation drive disc 25 spaced to be used in concert with fixed locking pin 18 and rotational linear actuator 20 for rotation, as described herein.

Figure 3:
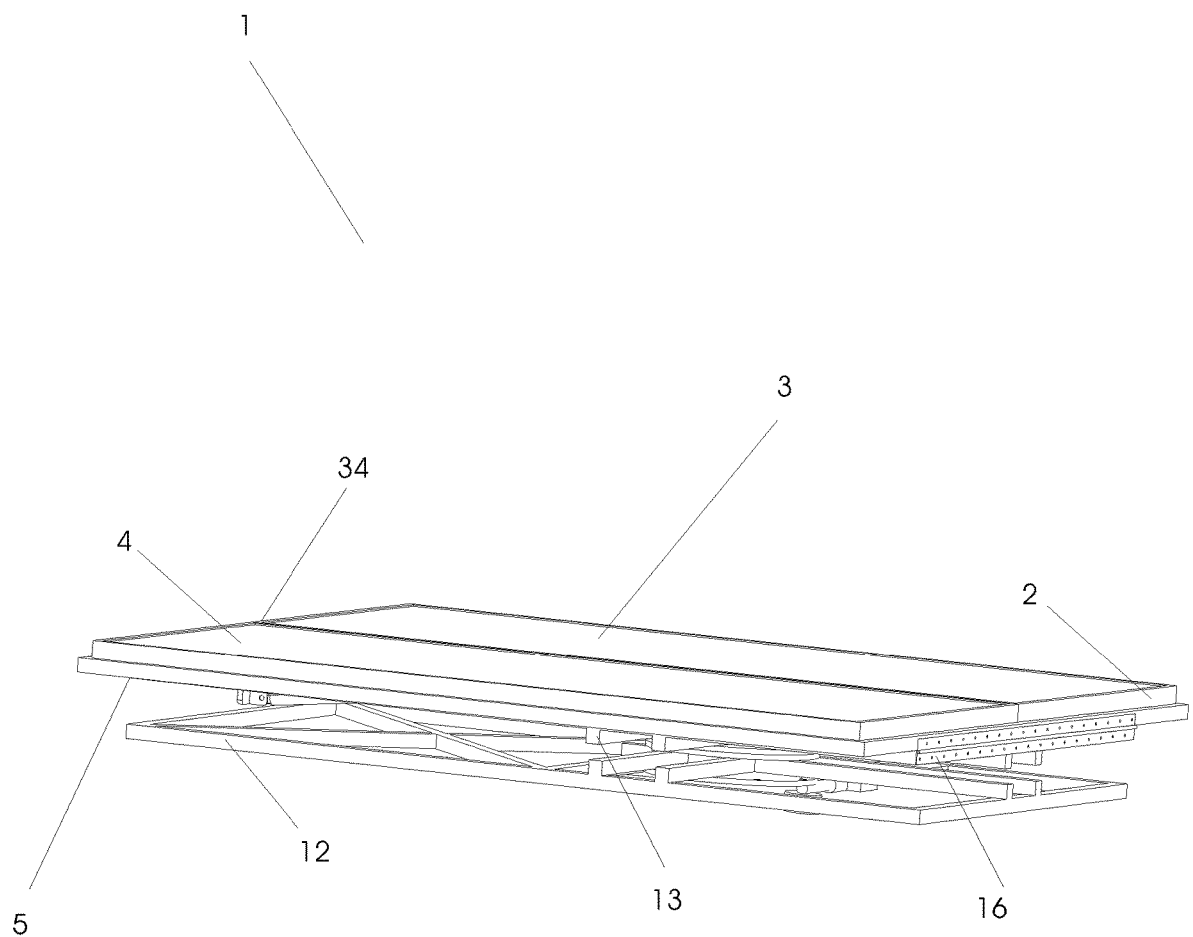
FIG. 3 is a side perspective view of the retracted or folded don tracker assembly of FIG. 1. in retracted or folded down Position.

FIG. 3 is a side perspective view of the solar tracker assembly 1 in a stowed position. The bottom frame 12 is coupled to the middle frame via the rotation components described with reference to FIG. 2.

Additionally, the middle frame 13 is coupled to the solar array mounting frame 2 via a solar array hinge 16. The solar array hinge 16 is a long-distributed hinge, commonly referred to as a piano hinge that connects the front of the solar array mounting frame 2 to the middle frame 13. This configuration allows solar array mounting frame 2 to rotate about solar array hinge 16, allowing solar array mounting frame 2 to tilt up while still being connected to middle frame 13.

The solar cell 4 and the solar cell 3 are coupled to the solar array mounting frame 2. Further, the solar array mounting frame 2 is fixedly coupled to the solar array frame 5. When the solar tracker assembly 1 is in the stowed position, as shown, the solar tracker assembly 1 is secured by a home position locking pin 34. Home position locking pin 34 is an electrically activated mechanism for inserting a locking pin into middle frame 13 when the solar tracker assembly 1 is rotated and lowered to the retracted or folded down home position. It can also be electrically removed when solar tracker assembly 1 is being deployed to track the sun. When locked, the solar tracker assembly 1 is in the road-ready mode secured by solar array hinge 16 and the home position locking pin 34.

Figure 4:
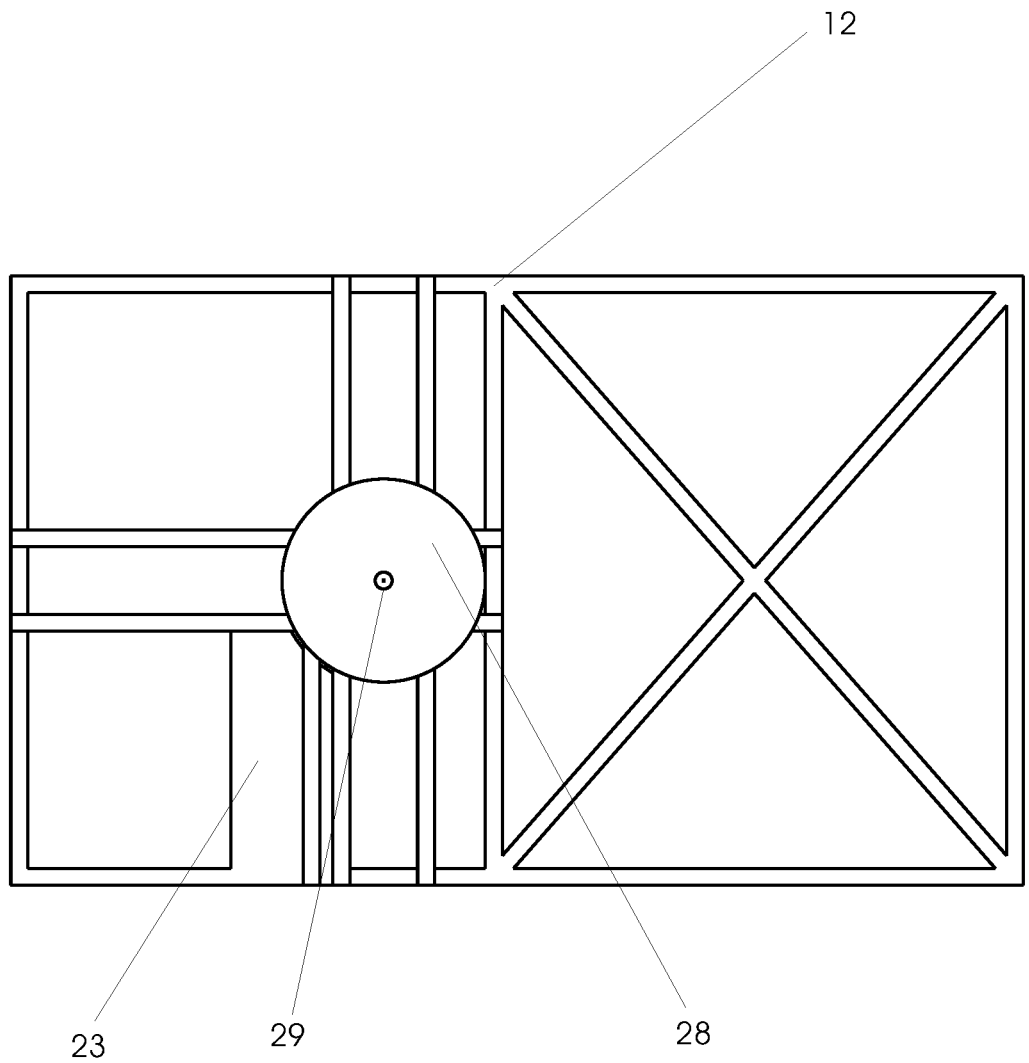
FIG. 4 is a bottom plan view of a frame of the solar tracker assembly.

FIG. 4 is a top plan view of the bottom Frame 12. On the bottom frame 12 is a bottom frame stabilizing plate 28 that is welded into Bottom Frame 12 to hold the weight and provide a rotation point for the middle frame 13 and the solar array frame 5. The bottom frame stabilizing plate 28 is a metal or other appropriate material plate welded or otherwise securely connected to the bottom frame 12 to spread the weight of the frame and provide stability of the rotation elements in the presence of wind or other forces.

In the bottom frame stabilizing plate 28 is a bottom stabilizing plate shaft hole 29. The bottom stabilizing plate shaft hole 29 allows rotation of a rotation shaft (not shown) to pass through the bottom stabilizing plate 28 unencumbered to rotation.

Further coupled to the bottom frame 12 is the rotational actuator mounting plate 23. As noted above, the rotational actuator mounting plate 23 may be welded to the bottom frame 12 for mounting the rotational linear actuator 20 and other support elements as described.

Bottom frame 12 attaches through adapters (not shown) to the roof or other portion of the RV. It can also be adapted to a stand-alone frame that can be mounted on the ground as a portable unit.

Figure 5:
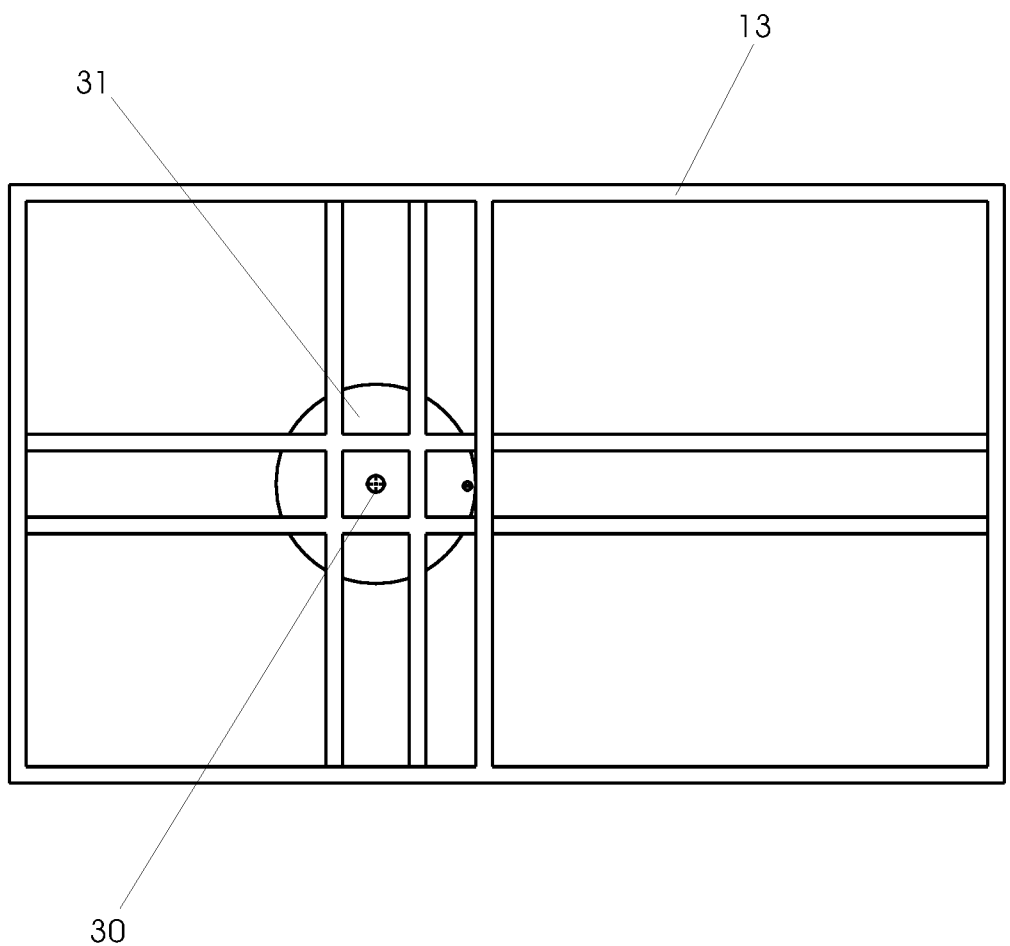
FIG. 5 is a top plan view of a middle frame of the solar tracker assembly of FIG. 1.

FIG. 5 shows middle frame 13, which has a middle frame stabilizing plate 31 similar to Bottom Frame Stabilizing Plate 28 (FIG. 4). There is a middle frame stabilizing plate shaft attachment port 30 in the middle frame stabilizing plate 31.

Note that middle frame stabilizing plate shaft attachment point 30 is the point that middle frame stabilizing plate 31 attaches to a rotational shaft (not shown) described further herein. Further, middle frame stabilizing plate 31 is a metal or other appropriate material plate welded or otherwise securely connected to middle frame 13 to spread the weight of the frame and provide stability of the rotation elements in the presence of wind or other forces.

Figure 6:
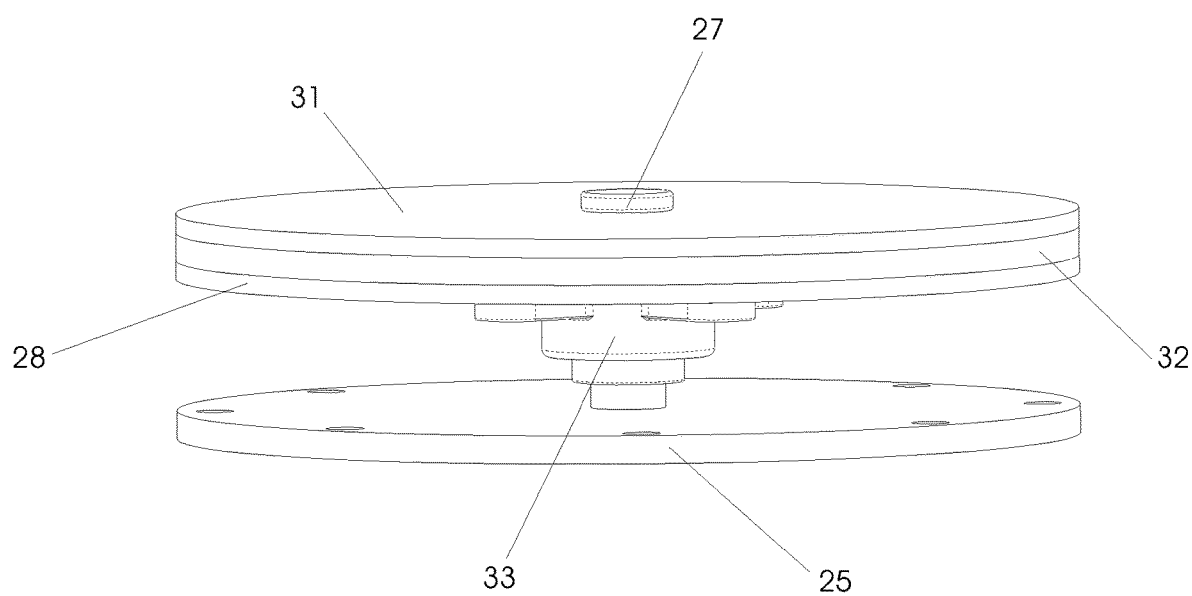
FIG. 6 is a side perspective view of a rotational components of the sun tracker assembly of FIG. 1.

FIG. 6 is a side plan view of the rotational components 160. In this regard, a rotary turntable 32 is sandwiched concentrically between middle frame stabilizing plate 31 and bottom frame stabilizing plate 28 to form a rotational bearing system to carry the weight of the solar tracker assembly 1. The rotary turntable 32 is a ball bearing commercially available turntable capable of supporting much more weight than the weight of the entire rotation system.

The top of rotary turntable 32 is attached permanently to middle frame stabilizing plate 31 while the bottom of rotary turntable 32 is permanently attached to bottom frame stabilizing plate 28. However, the main purpose of this arrangement is to carry the weight of the solar tracker assembly 1.

A rotational bearing 33 provides a rigid rotational point to help distribute lateral forces on the assembly and to connect to rotation drive disc 25. Rotational bearing 33 is also permanently attached to bottom frame stabilizing plate 28 while a rotational shaft 27 is permanently attached to the middle frame stabilizing plate 31 and the rotation drive disc 25 by welding or other appropriate means.

Note that the rotational shaft 27 may be a stainless steel or other appropriate material to form a strong point of rotation. Further note that the rotational bearing 33 is a commercially available bearing assembly that supports heavy weight and an at least one-inch shaft for lateral strength. The rotation drive disc 25 drives the middle frame stabilizing plate 32 via rotational bearing 33 and rotary turntable 32 and therefore rotates middle frame 13.

Figure 7A:
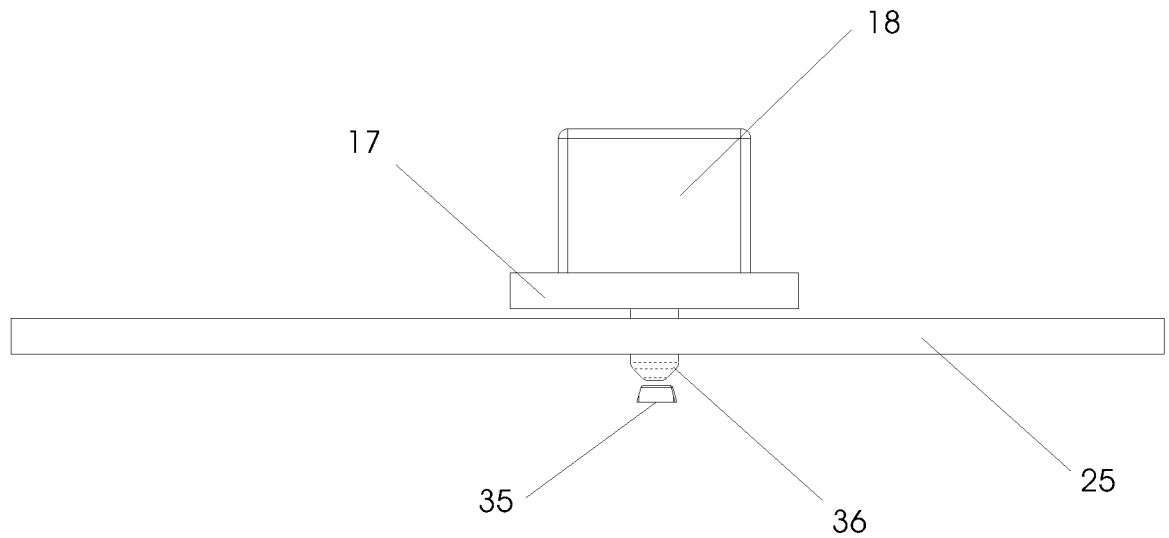
FIG. 7A is a side view of an engaged locking pin of the solar tracker assembly of FIG. 1.

FIG. 7A is a side view of the rotation drive disc 25 coupled to the fixed locking pin 18. Although FIG. 7A shows a fixed locking pin 18, the operation of actuator locking pin 24 and home position pin 34 are identical. Fixed locking pin 18 is an electrically engaged solenoid, actuator, or another device that can extend or retract a pin 36. Pin 36 is a locking round metal pin that can be extended or retracted by a solenoid (not shown) or other electro-mechanical means.

The pin 36 is spring loaded such that if not activated, it will extend into one of the retention holes 26 in rotation drive disc 25 when it aligns.

Further, the solar tracker assembly 1 comprises a pin sensor 35. Pin sensor 35 is a hall effect or other electronic device that can sense the presence of pin 36 when it extends through the one of the retention holes 26. Output from the pin sensor 35 provides the solar tracker assembly 1 a positive indication of the engagement of the pin 36 in one of the retention holes 26. When the pin is engaged, the rotation drive disc 25 cannot rotate until the pin 36 is retracted. Note that Pin Sensor 35 is an appropriate electronic sensor that senses the presence of the proximity of Pin 36 when in the locked position.

Figure 7B:
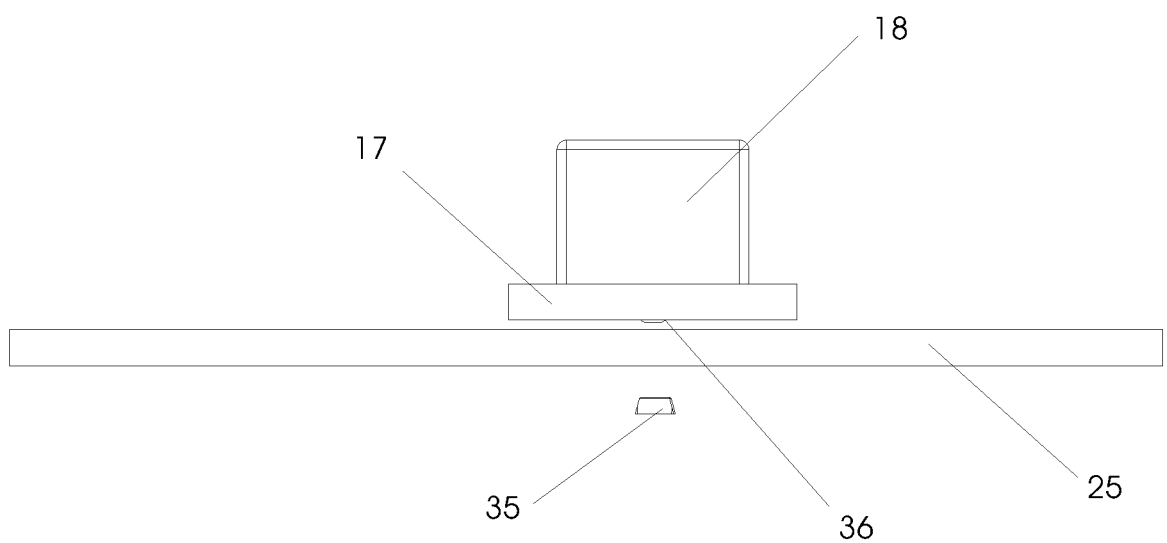
FIG. 7B is a side plan view of a disengaged locking pin of the solar tracker assembly of FIG. 1.
Figure 8:
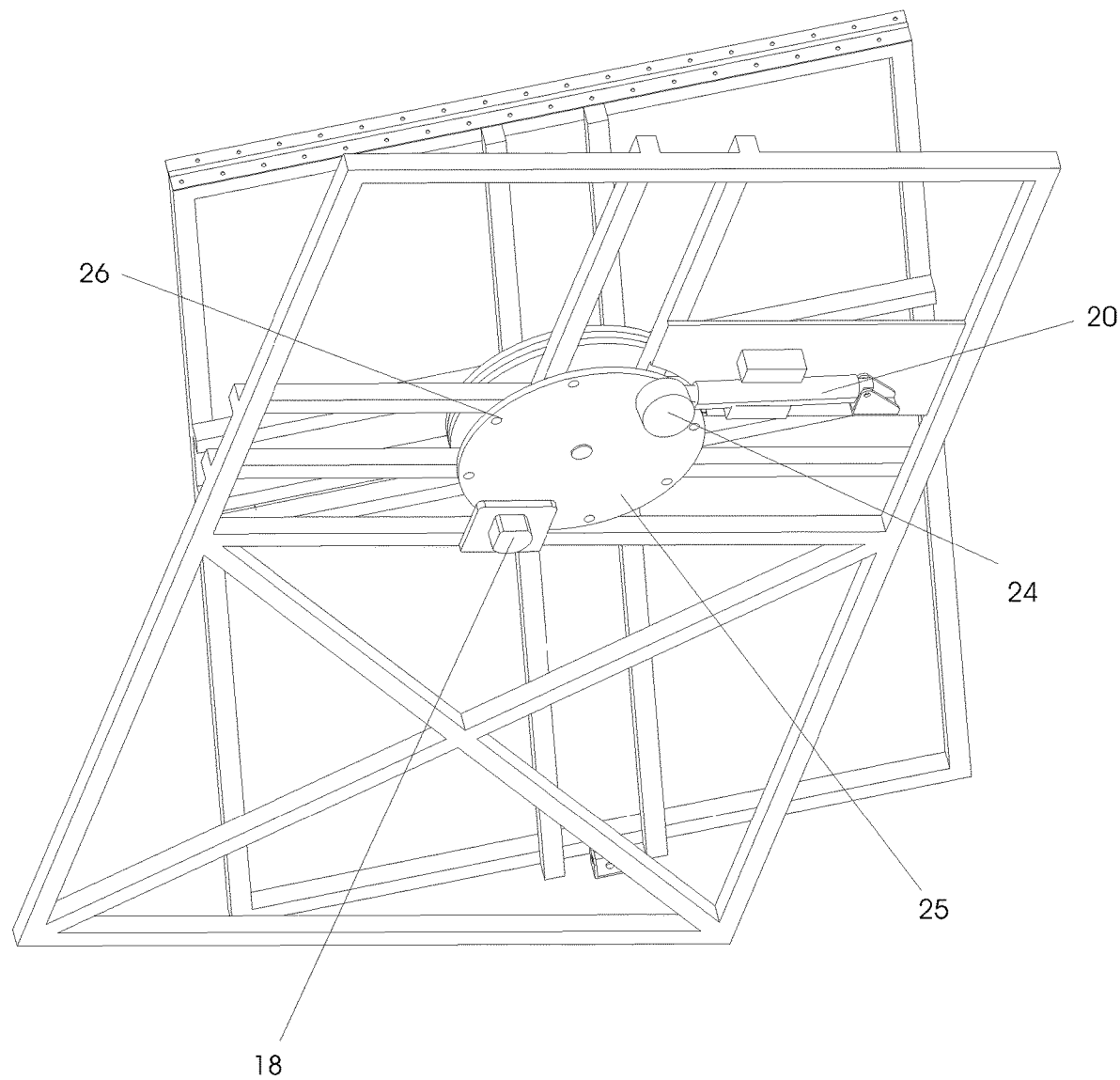
FIG. 8 is a perspective bottom view of a rotational drive disc in a starting position of the sun tracker assembly shown in FIG. 1.

FIG. 7B is a side view of the fixed locking pin 18 disengaged from the rotation drive disc 25. Note that FIG. 8 shows the fixed locking pin 18; however, the following description applies to the actuator locking pin 24. Both pins 18 and 24 extend into rotation drive disc 25. This provides redundant locking of rotation drive disc 25 and it cannot be moved or rotated when the pins 18 and 24 are engaged.

FIG. 8 is bottom view of the solar tracker assembly 1 with the rotational drive disc 25 at a starting position. The fixed locking pin 18 is inserted in one of the retention holes 26. Further, the actuator locking pin 25 is inserted in one of the retention holes 26. The rotational linear actuator 20 comprises a motor (not shown) and a drive (not shown) to control movement of the actuator locking pin 24.

Figure 9:
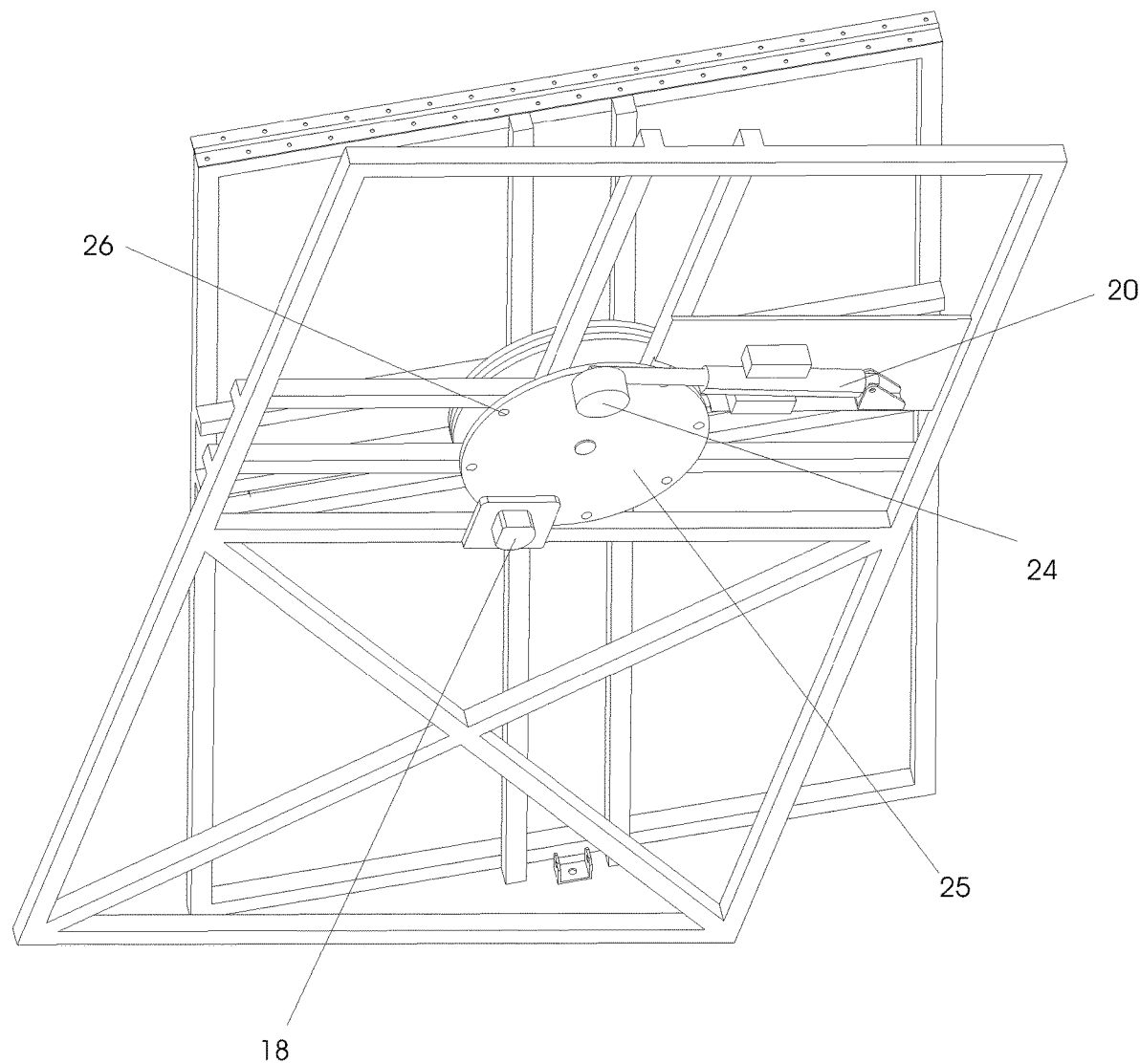
FIG. 9 is a perspective bottom view of a rotation drive disc in a reset position of the sun tracker assembly of FIG. 1.

FIG. 9 is a bottom view of the solar tracker assembly 1 in a reset position. In this regard, to rotate rotation drive disc 25 Clockwise, the rotational linear actuator 20 retracts the actuator locking pin 24 and moves up to the next retention hole 26. Rotation drive disc 25 remains in place, locked by fixed locking pin 18. The pin in Actuator Locking Pin 24, spring loaded, drops into the retention hole 26 when it aligns with the next retention hole 26. At this point, Fixed Locking Pin 18 is retracted.

Figure 10:
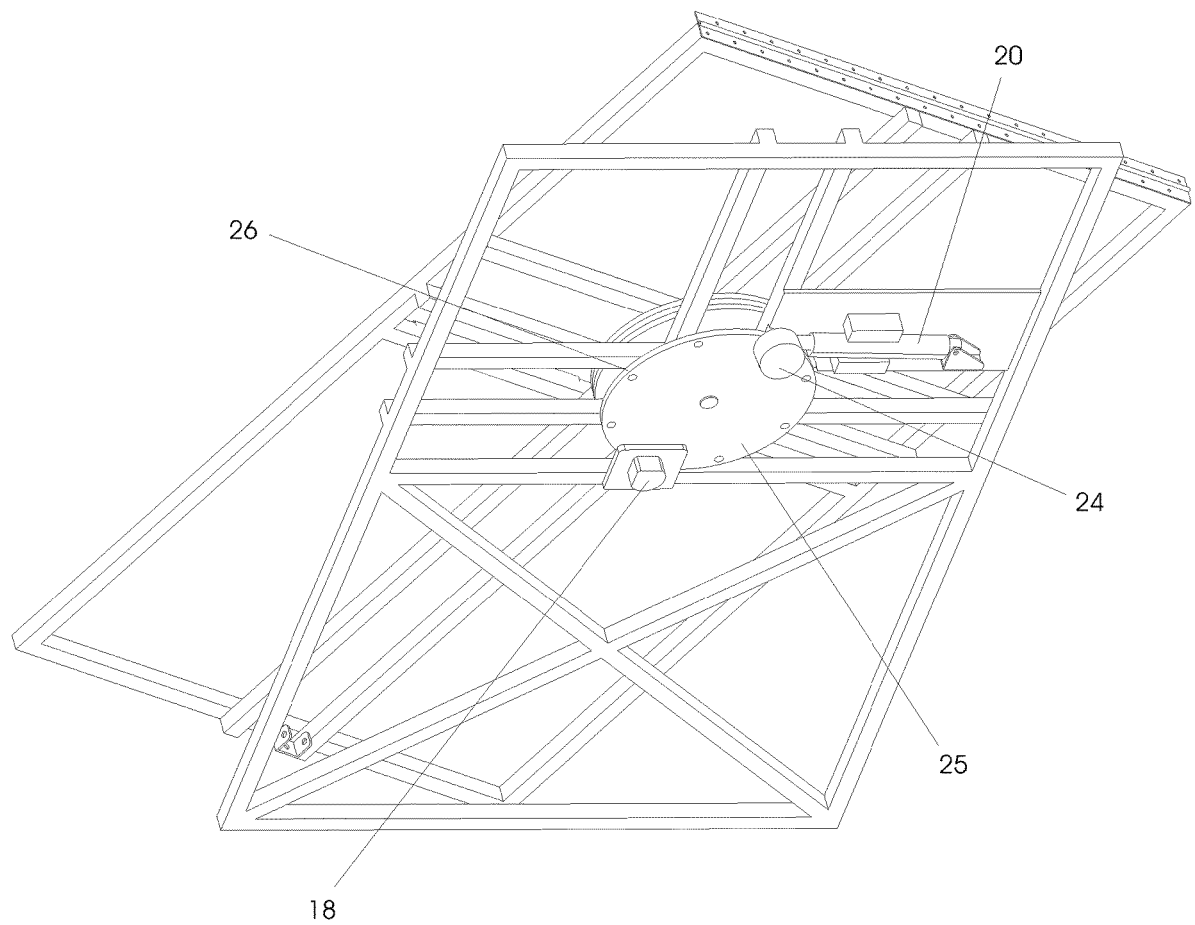
FIG. 10 is a bottom perspective view of a rotation drive disc in a rotational position of the sun tracker assembly of FIG. 1.

FIG. 10 is a bottom view of the solar tracker assembly 1 in a rotational position. In this regard, rotational linear actuator 20 pulls rotation drive disc 25 in the clockwise direction.

This process is repeated to move rotation drive disc 25 either counterclockwise or clockwise. Thus, as described, solar array mounting frame 2 with solar cell 4 and Solar cell 3 permanently attached can be tilted from 0 to 75 degrees and rotated greater than +/−360 degrees, depending only on the limitations of the wiring harness. This operation allows solar tracker assembly 1 to completely track the sun anywhere in the sky.

Figure 11:
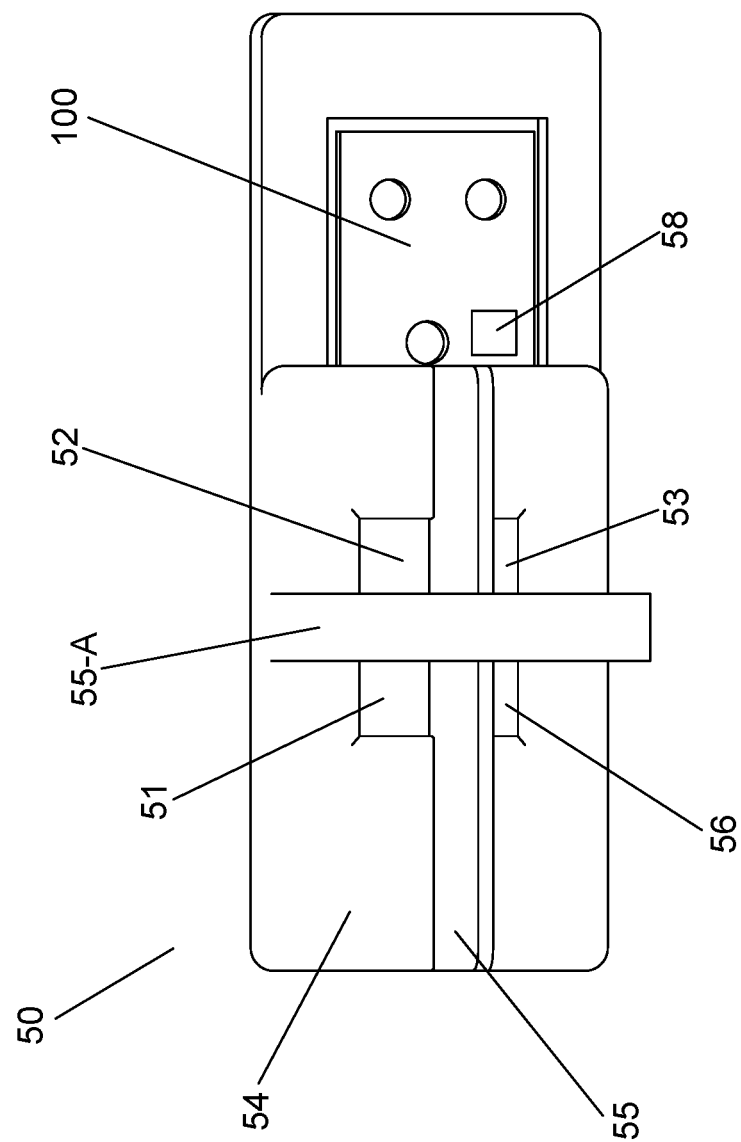
FIG. 11 is a top perspective view of a sun tracker device and accelerometer of the sun tracker assembly of FIG. 1.

FIG. 11 shows sun tracker module 50. Two sun tracker module 50 tracks the sun's position in the sky. Sun tracker module 50 is fixedly coupled to the solar array mounting frame 2 (FIG. 1).

The sun tracker module 50 comprises an enclosure 54 for housing the elements of the sun tracker module 50. Enclosure 54 contains a printed circuit board 100 with electronics and wiring to interface to the solar cells 3 and 4 (FIG. 1) and accelerometer 58.

Within the enclosure is a top left sensor 51, a top right sensor 52, a lower left sensor 56, and a lower right sensor 53. The sensors 51, 52, 53, and 56 are mounted in apertures such that the sensors 51, 52, 53, and 56 are exposed to the sun.

Mounted over the sensors 51, 52, 53, and 56 is a horizontal shade barrier 55-A and a vertical shade barrier 55. The horizontal shade barrier 55-A and the vertical shade barrier 55 selectively blocks or exposes energy from the sun to the sensors 51, 52, 53, and 56.

The sensors 51, 52, 53, and 56 output a signal indicative of the quantity of solar energy to which the respective sensors 51, 52, 53, and 56 are exposed. Position of the sun may be determined by the amount of energy detected by a respective sensor 51, 52, 53, and 56. In this regard, the barriers 55 and 55-A block portions of the sun from one or more of the sensors 51, 52, 53, and 54 such that the energy exposed to each sensor 51, 52, 53, and 54 is indicated in the output of the sensors 51, 52, 53, and 54.

The sun tracking module 50 further comprises the printed circuit board 100. Among other components, the sun tracking module 50 comprises an accelerometer, which reads the angle of the solar array mounting frame 2. The accelerometer 58 is a commercially available micro-electromechanical systems (MEMS) three axis accelerometer that measures vibration and gravity (Array tilt angle) for feedback to Master Controller 37.

The data indicative of the energy exposure of the sensors 51, 52, 53, and 56 is transmitted to a control device (described further herein). The control device uses the data indicative of the energy exposure of the sensors 51, 52, 53, and 56 to determine whether to rotate the solar array mounting frame 2.

Figure 12A:
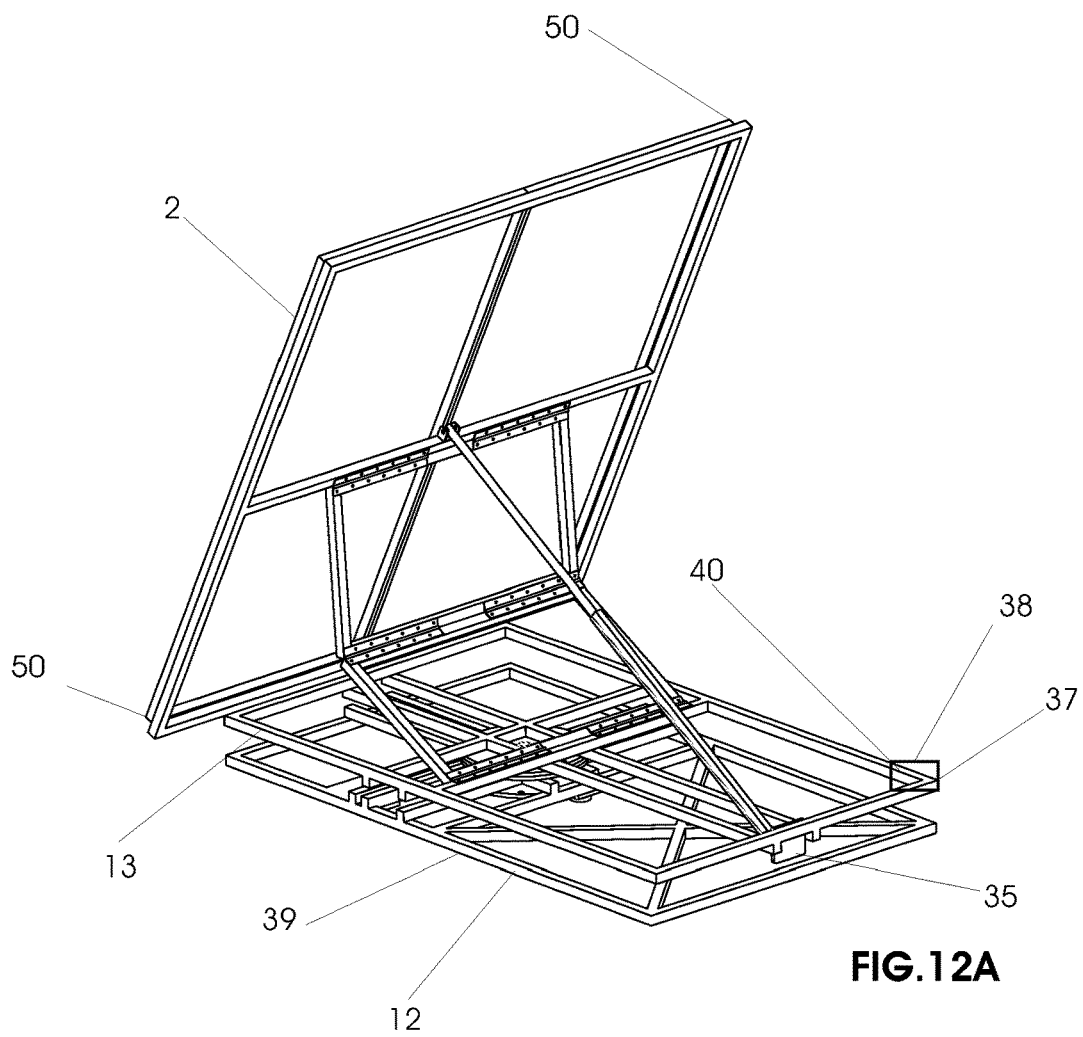
FIG. 12A is a perspective view of the sun tracker assembly of FIG. 1 showing sensors used during sun tracking.

FIG. 12A shows the control box 37 fixedly coupled to the middle frame 13. The control box 27 comprises, among other components, a magnetometer 38 and a global positioning system (GPS) 40. Also, the control box 27 comprises memory (not shown) and a processor (not shown), which are described further herein.

In one embodiment, the memory comprises data indicative of table of where the sun is positioned at each time of data across all time zones. Thus, in one embodiment, the processor is configured to rotate the solar array frame based upon the time of the year, wherein the solar array assembly is located geographically, and the time of day. In this regard, the processor does not need data from the sun tracker module 50 (FIG. 11) to rotate the solar array panel 2.

The GPS 40 and the magnetometer 38 are mounted within Master Controller 37 as described above. The GPS 40 measures the latitude and longitude of the vehicle to which the solar tracker assembly 1 is coupled, the universal time, and speed of the vehicle, plus many other parameters as needed. Note that the GPS 40 may be a standalone GPS integrated Circuit with antenna and cellular modem to provide data for tracking and motion and position of the vehicle. It also has the ability to transfer and receive data via a cellular network (not shown).

The magnetometer 38 measures the magnetic heading of middle frame 13 as it rotates, allowing closed loop tracking and wind vibration when deployed. Magnetometer 39 measures the heading of Bottom Frame 12, which is permanently mounted to the vehicle or residence, thus measuring the heading of the vehicle and the residence is useful in initializing the sun tracker 50. Magnetometers 38 and 39 are commercially available electronic magnetometers to measure the magnetic heading of bottom frame 12 which is the home position and the heading that the vehicle is parked.

Figure 12B:
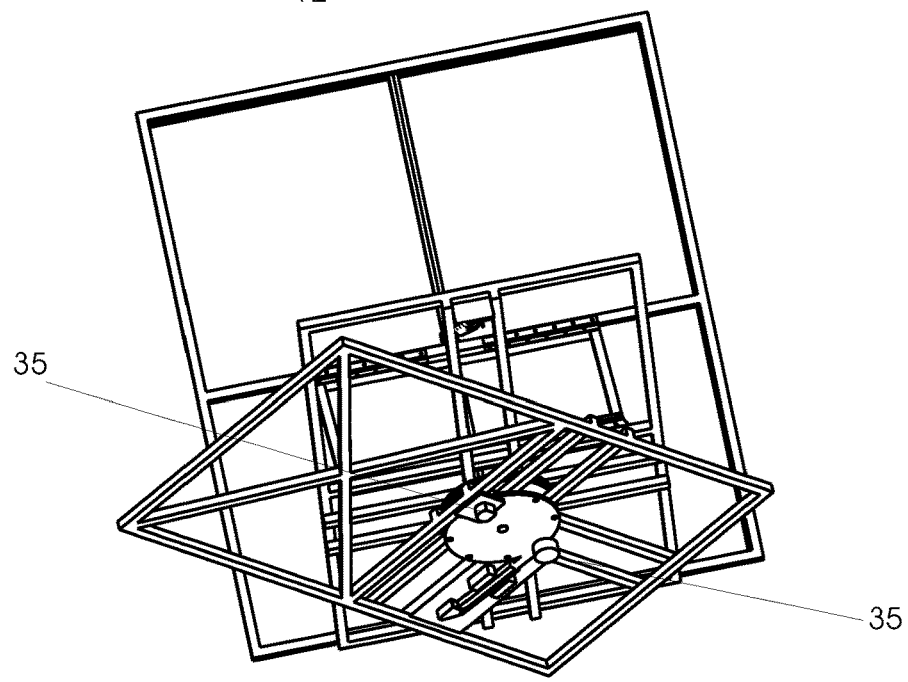
FIG. 12B is a perspective view of the sun tracker assembly of FIG. 1 showing other sensors used during sun tracking.

With reference to FIG. 12B, there are three pin sensors 35, There is a pin sensor 35 on fixed locking pin 18 (FIG. 7A). There is one sensor 35 on actuator locking pin 24 (FIG. 2), and there is one sensor 35 on home position locking pin 34 (FIG. 3). All sensors 35 are connected to Master Controller 37 using wires.

Figure 13:
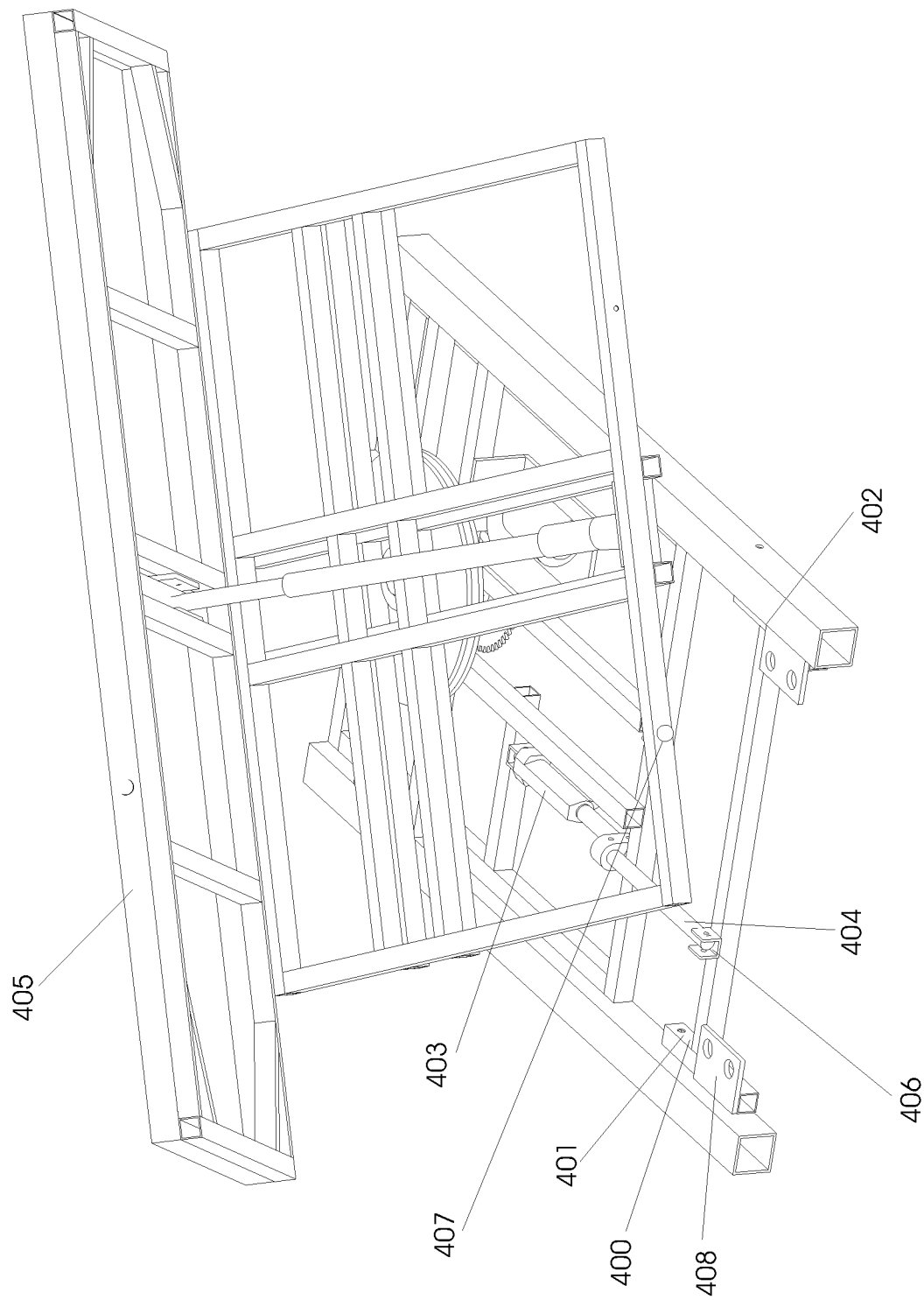
FIG. 13 is a perspective view of the deployed sun tracker assembly of FIG. 1 showing a locking bar.

FIG. 13 is a back-perspective view of the sun tracker assembly 1. The sun tracker assembly 1 comprises bumpers 405 and 407. Further, the sun tracker assembly 1 comprises a locking bar 400, a connecting rod 404, and a pressure pad 408.

FIG. 13 shows the locking bar 400 release and in a fully open position. Note that the operation with the locking bar 404 is described with reference to one side of the sun tracker assembly 1 only. However, the identical configuration could be used on the opposing side as well.

When the sun tracker assembly 1 is in a retracted position, i.e., the solar cells 3 and 4 are positioned relative to the sun, the locking bar is fully retracting so as not to interfere with rotational or linear movement of the frames or component parts.

The locking bar 400 locks the rotating and vertical tiling when the sun tracker assembly 1 is in a folded down position. This ensures that no parts of the sun tracking assembly 1 can move during transport or otherwise.

The pivot point 401 is the left pivot point of the locking bar 400. The pivot point 402 is the right pivot point of the locking bar 400.

The sun tracker assembly 1 further comprises a linear actuator 403 that moves the locking bar 400 into the deployed or folded position. The linear actuator is any type of standard off-the-shelf linear actuator capable of moving the locking bar 400.

The sun tracker assembly 1 further comprises the connection rod 404. The connection rod 404 connects the linear actuator 403 to the locking bar 500. This allows the locking bar 400 to move into a deployed or folded-down position. Further, the connection rod 406 connects the connection rod 404 to the locking bar 400.

The rubber bumpers 405 and 507 are affixed to the frames of the sun tracker assembly 1. The bumpers 405 and 407 allow the locking bar 500 to securely lock down the frames when in the retracted position.

Pressure pad 408 is a flat plated affixed to the locking bar 400. The pressure pad 408 applies pressure to the frames when in the locked position. In one embodiment, the pressure pad 408 is covered in a rubber-type material.

Figure 14:
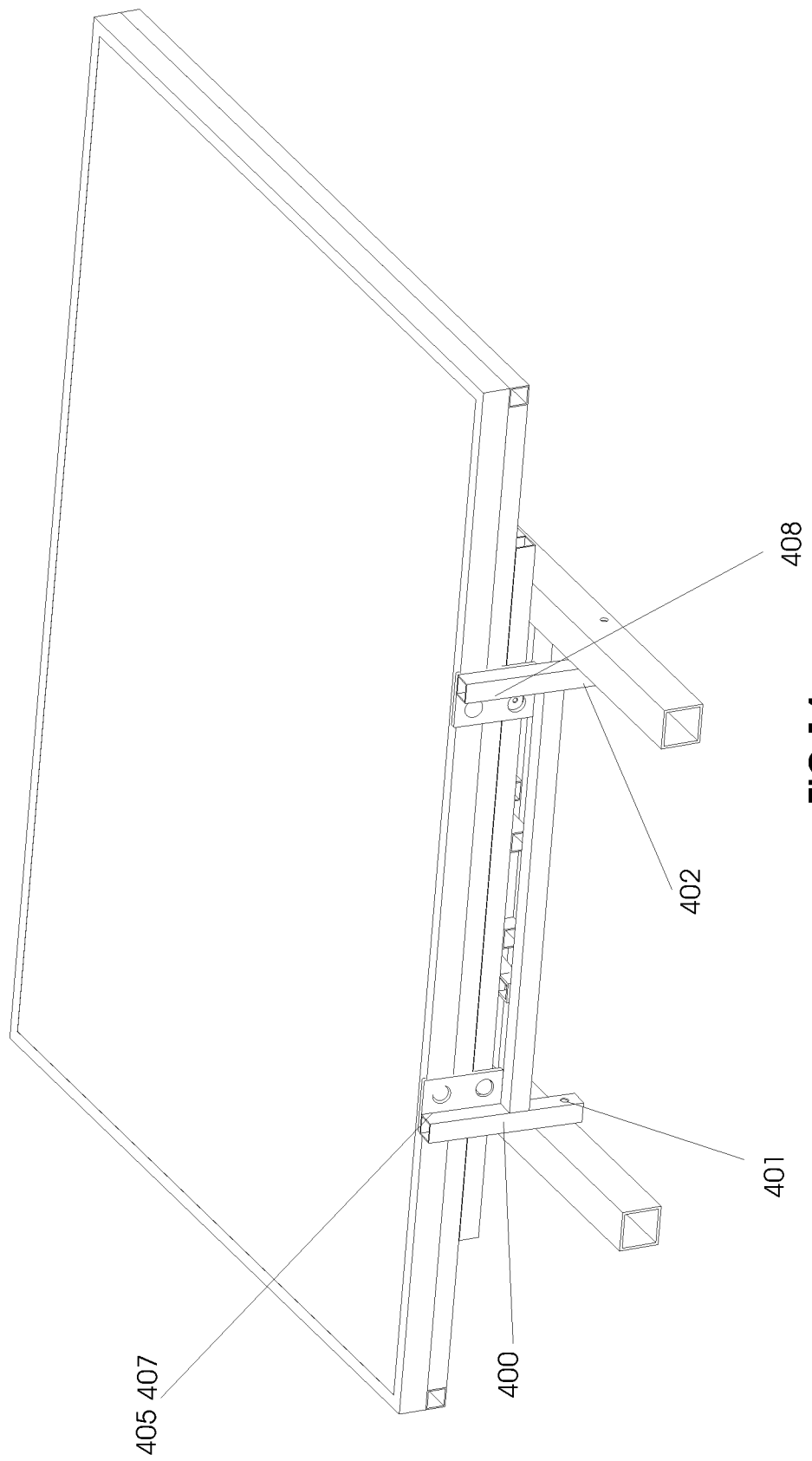
FIG. 14 is a front perspective view of a retracted sun tracker assembly of FIG. 1 showing the locking bar.

FIG. 14 shows the sun tracker assembly 1 in a fully locked position. In such a position, the locking bar 400 secures the frames of the sun tracker assembly 1. Linear actuator (FIG. 13) pulls connection rod 404 to move the locking bar 400 into the locked position applying pressure to rubber bumpers 405 and 407. Thus, the frames of the sun tracker assembly 1 are securely locked for transport.

Figure 15A:
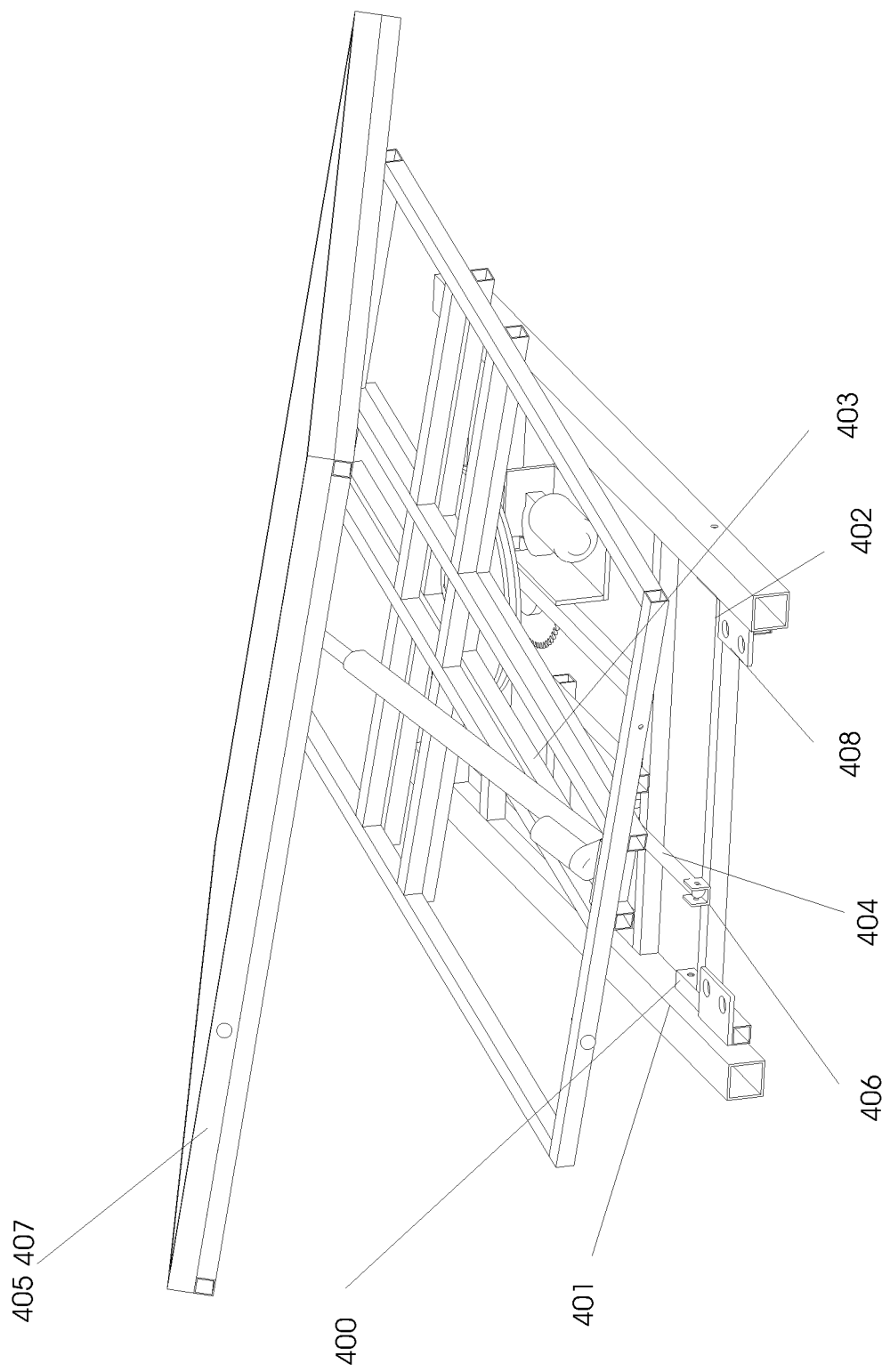
FIG. 15A is a back-perspective view of the deployed sun tracker assembly of FIG. 1.

FIG. 15A shows the sun tracker assembly 1 in a retracted position. In this regard, all the frames are deployed. In such a scenario, locking bar 400 retracts for full clearance to allow the frames to rotate freely without obstruction.

Figure 15B:
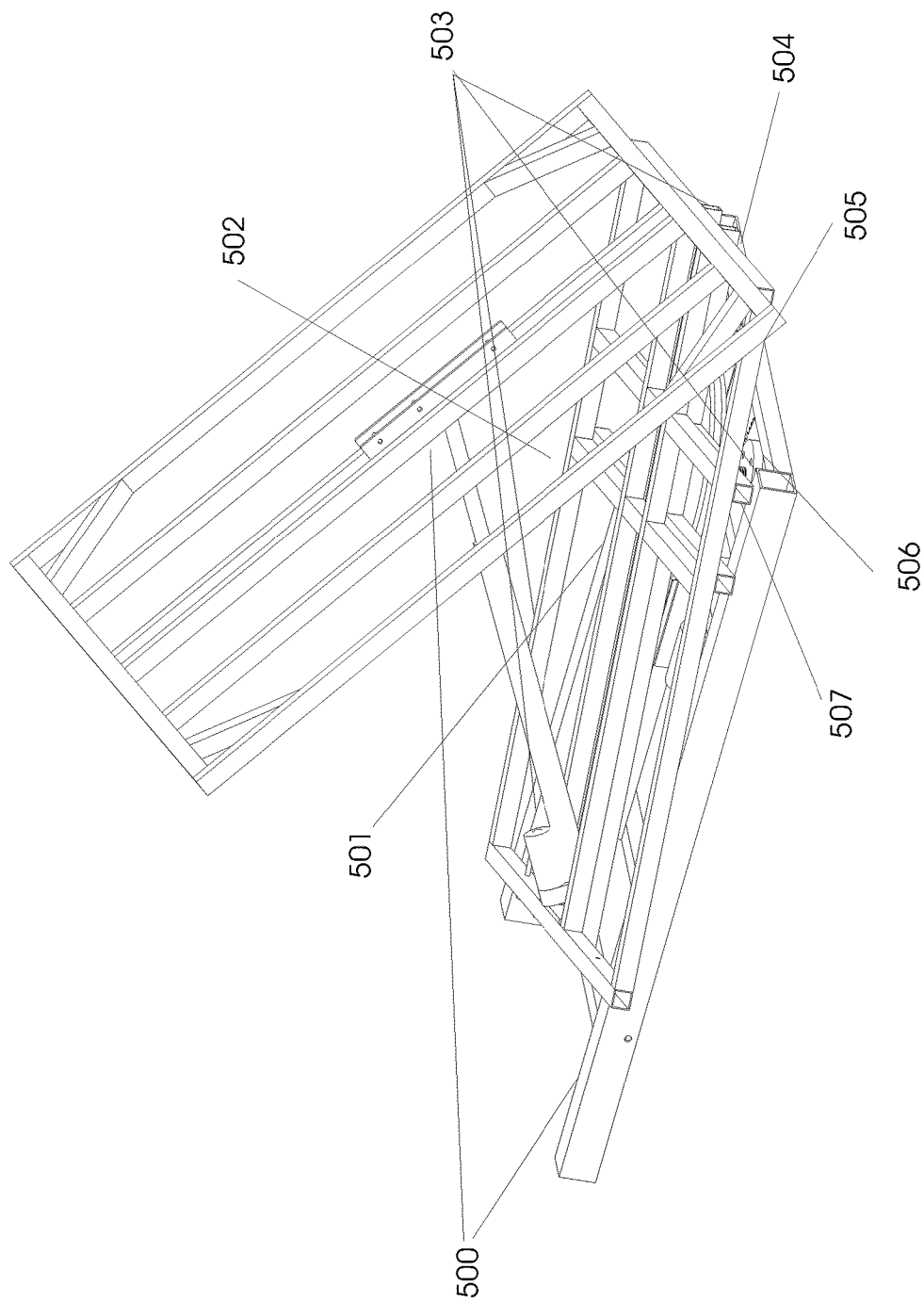
FIG. 15B is a side-perspective view of the deployed sun tracker assembly of FIG. 1.

FIG. 15B is a perspective view of an embodiment of the sun tracker assembly 1 in a deployed position. In the deployed position, the sun tracker assembly 1 comprises two sun trackers, including a sun tracker 508 and a sun tracker 505. The sun trackers 508 and 505 are substantially similar to the sun tracker described with referenced to FIG. 11. The sun trackers 505 and 508 are mounted to the solar array frame 1 (FIG. 1).

Mounted to the middle frame 13 is an electronics enclosure that houses the electronics described with reference to FIG. 16. Also, mounted to the middle frame 13 at each corner, is a road-ready locking pin and sensor. These locking pins and sensors ensure that when the vehicle is moving, the sun tracker assembly 1 is locked down. Thus, no damage can be done to the sun tracker assembly when the vehicle is in use.

Further, mounted to the bottom frame is a front wind shield 504. The front windshield 504 protects the components of the sun tracker assembly 1 from wind that may be encountered while driving the vehicle or while the vehicle is parked.

The sun tracker assembly 1 further has a cable handler 506. The cable handler is configured to secure and manage the cables that connect the various electrical components of the sun tracker assembly 1.

Further, the sun tracker assembly 1 comprises the rotational locking pin 501, which is described herein. The rotational locking pin 506 is projected onto one of the retention holes 26 (FIG. 2) around the outside edge of the rotation drive disc 25 (FIG. 2). In addition, the sun tracker assembly 1 comprises a rotational actuator mechanical release 507 that allows the locking pin 506 to be retracted from the hole. Also, the sun tracker assembly 1 comprises a vertical linear actuator 9 to mechanically release.

Figure 16:
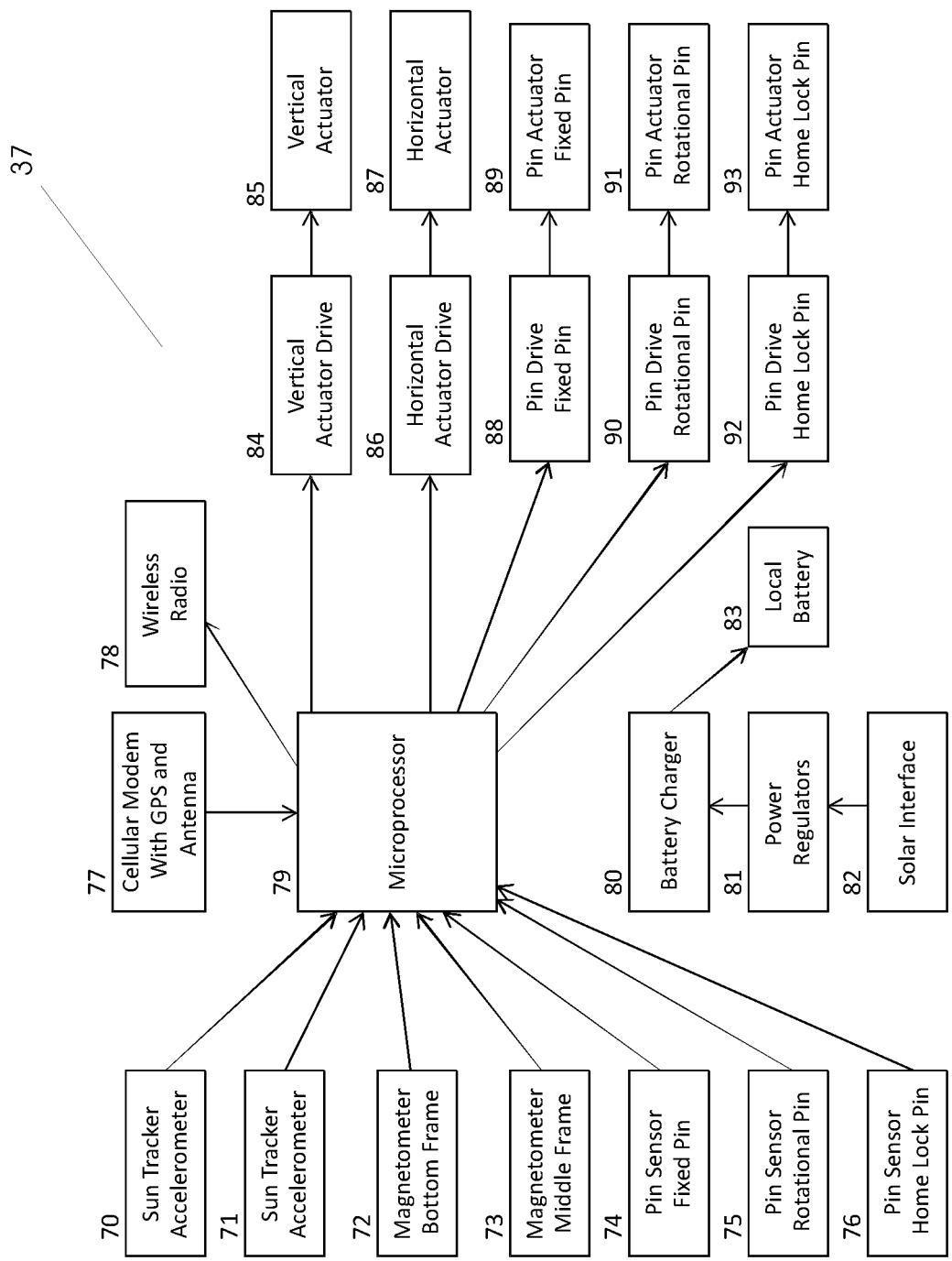
FIG. 16 is a block diagram of a master controller of the sun tracker assembly of FIG. 1.

FIG. 16 is a block diagram of an exemplary master controller 37 mounted on middle frame 13. The master controller comprises a microcontroller 79. The exemplary microcontroller 79 comprises a microprocessor 153, memory 152, and an input/output device 154. Stored in memory 152 is control logic 150.

The microprocessor is any type of processor known in the art or future developed. The microprocessor executes instruction of the control logic 150.

The control logic 150 generally controls the functionality of the solar tracker assembly 1. The control logic 150 may be software, hardware, firmware, or any combination thereof. In the embodiment shown, the control logic 150 is software stored in memory 152.

The memory 152 may be any type of memory known in the art or future developed. In this regard, memory 152 may be primary memory, such as random-access memory (RAM) or read-only memory (ROM). Memory 152 may be secondary memory, such as a hard dive or a compact disc.

The input/output device 154 is any device capable of receiving data from a user and transmitting data to the user. The input/output device 154 may be a touchscreen to which data may be displayed by the control logic 150 or from which the control logic 150 may receive data from the user. Such a touchscreen may be installed within the vehicle.

Components 70-78 provide inputs to microprocessor 79. Components 70 and 71 represent accelerometers mounted to the sun tracker module 50 (FIG. 11). The accelerometers aid the microcontroller in determining a current position of the sun tracker assembly 1 (FIG. 1) during operation. Components 72 and 73 represent magnetometers. The magnetometers 72 and 73 enable the microcontroller 79 in determining the relative position of the vehicle on which the sun tracker assembly 1 is mounted.

Component 84 is the vertical actuator drive communicatively coupled to the vertical actuator 85. Component 86 is the horizontal actuator drive communicatively coupled to the horizontal actuator 87. Based upon inputs received via the components 70-78, the control logic 150 controls movement of the sun tracker assembly 1 in the vertical and horizontal positions during operation.

Component 88 is the pin drive fixed pin communicatively coupled to pin actuator fixed pin 89. Component 90 is the pin drive rotational pin 90 communicatively coupled to the pin actuator rotational pin 91, and component 92 is a pin drive home lock pin 92 communicatively coupled to a pin actuator home lock pin 93.

Based upon inputs received via the components 70-78, the control logic 150 controls movement of the sun tracker assembly 1 in the vertical and horizontal positions during operation via the vertical actuator drive 84 and horizontal actuator drive 86. Further, the control logic 150 controls the pin drives 88-92 to aid in movement of the sun tracker assembly 1.

The data from the sun tracker module 50 is, for example, intensity measurements measured by the four sensors 51, 52, 53, and 56 (FIG. 11), described above. Also, the data may be indicative of a reading from at least one accelerometer 58 (FIG. 11) on the sun tracker module 50. Note that these measurements are used by the control logic 150 to determine the position of the solar cells 3 and 4 for maximum energy absorption.

The microcontroller receives measurements from 70-78, and the measurements are processed and calibrated by control logic 150 within microprocessor 79. As previously noted, the block 70 represents a GPS that communicates with the microcontroller 79 data indicative of the position of the solar tracker assembly 1. The data is used by the microcontroller 79 to assist in sun tracking and solar tracker assembly positioning throughout the day.

As indicated above, the block 77 represents an optional cellular modem that provides standard national marine electronics association (NMEA) data including data indicative of speed, latitude, longitude, universal time and many other parameters. The microcontroller 79 uses the data to assist in sun tracking depending upon the position of the vehicle (provided by block 70) and the time of day.

The Block 78 represents a wireless radio connection, Bluetooth, or other format/configuration to communicate with an output device 154 inside the vehicle.

After processing the sensor data, and reading the GPS data, the control logic 150 transmits commands to components of the solar tracking array 1 such as the horizontal actuator drive 86, the pin drive fixed pin 88, the pin drive rotational pin 90, and the pin drive home lock pin 92.

That is, the horizontal actuator drives 86 controls the horizontal actuator 87 based upon information received from the control logic 150. The pin drive fixed pin 86 controls the pin actuator fixed pin 89 based upon information received from the control logic 150. The pin drive rotation pin 90 controls the pin actuator rotational pin 91 based upon information received from the control logic 150 and the pin drive home lock pin 92 controls the pin actuator home lock pin 93 based upon information received from the control logic 150

Notably, the configuration described results in a closed loop system, which is the tilt angle and heading of the solar tracker assembly 1 known and monitored during operation to control solar tracker assembly 1.

In one embodiment, the master controller 37 contains a local lithium or other technology battery 83 that can power the solar tracker assembly 1 independent of the vehicles' batteries.

Solar power is used to charge the internal battery to drive the actuators and keep the electronics active. 82 is a solar interface connection than brings in solar power from Solar Cell 2 and Solar Cell 3 when exposed to the sun. 81 regulates the power for the electrical requirements of Master Controller 37, and block 80 provides charging current a local battery 83.

A user may enter data and user commands received from input/output device 154 via Wireless Radio 78 including battery charge, frame positions, wind status, and other parameters as required.

Microcontroller 37 also contains interface hardware (not shown) that can directly interface to a cellular device, allowing for future apps to interface to Master controller 37 via cellular modem 77, Bluetooth 78, or another appropriate interface.

Figure 17:
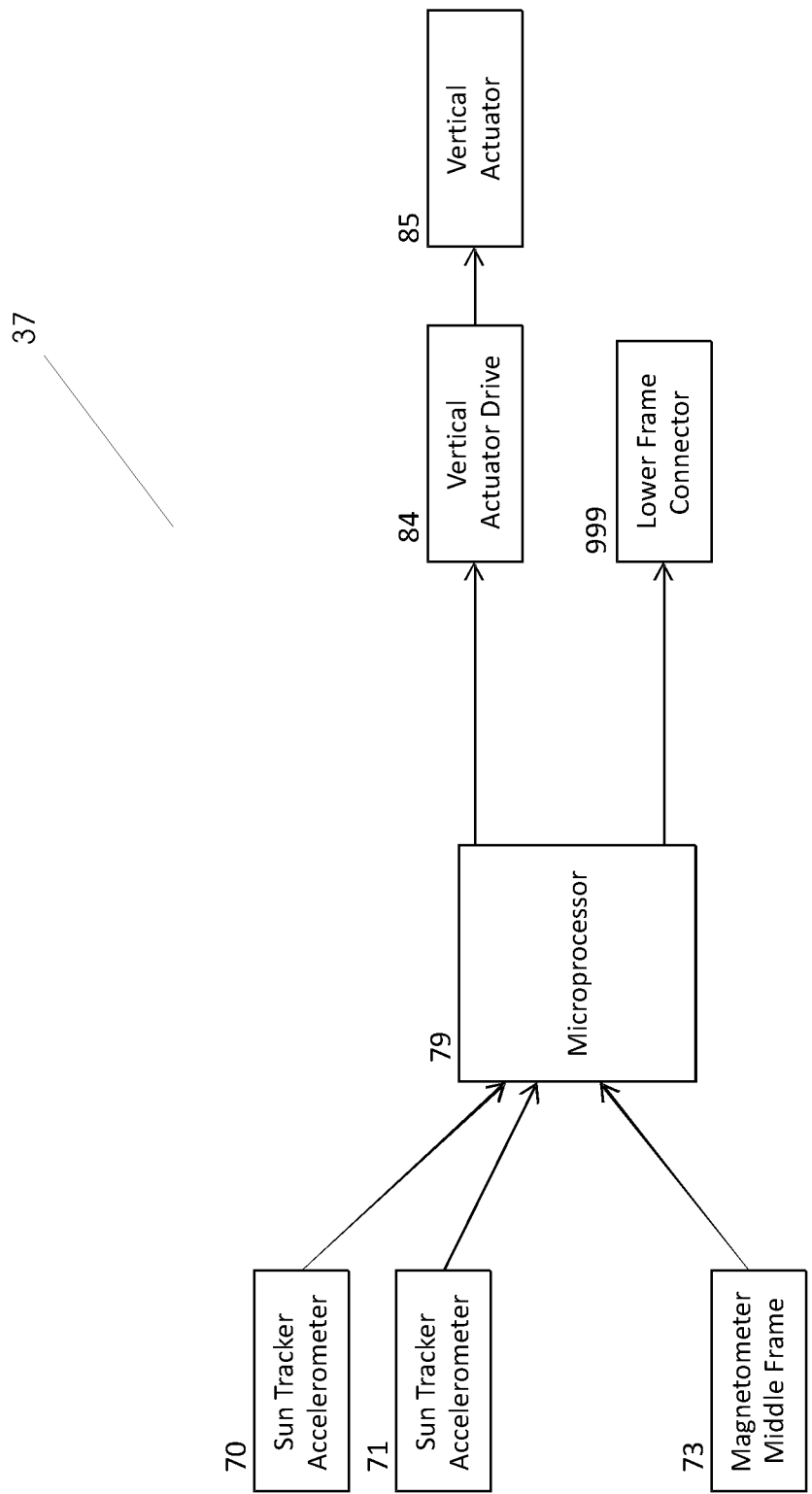
FIG. 17 is a block diagram of the master controller of the sun tracker assembly of FIG. 16.

In one embodiment, the solar tracker assembly 1 comprises electronics that are mounted to an upper portion of the sum tracker assembly 1 as shown in FIG. 17. These electronics are in communication with the microcontroller 79 (FIG. 16).

In this regard, the sun tracker accelerometers 70 and 71 may be mounted to an upper portion of frame and transmit data to the microcontroller 79 for use in determining movement of the sun tracker assembly 1.

In addition, the magnetometers 73 may be mounted on an upper portion of the sun tracker assembly and periodically or upon demand supply directional data to the microcontroller 79. Also mounted to an upper portion of the sun tracker assembly 1 may be the vertical actuator drive that controls the vertical actuator 85. All these components can communicate via a lower frame connector, described further herein.

FIG. 17 is a block diagram of the exemplary master controller 37. The microcontroller 79 is communicatively coupled to a lower frame connector for interfacing with components in the sun tracker assembly 1.

Further, the microcontroller 37 is communicatively coupled to the vertical actuator drive 84. The microcontroller 79 communicates with the vertical actuator 85 through the vertical actuator drive 84. The microcontroller 27 may communicate commands to the vertical actuator 85 to lift or bring down the solar array mounting frame 2.

In addition, the microcontroller 79 is communicatively coupled to the magnetometer on the middle frame 13. In this regard, the microcontroller 79 receives data indicative of a direction of the bottom frame 12. The microcontroller 79 orients movement of the middle frame 13 based upon the data indicative of direction of the bottom frame.

The microcontroller 79 further is communicatively coupled to the sun tracker accelerometer 70 and the sun tracker accelerometer 71. The sun tracker accelerometers 70 and 71 transmits data to the microcontroller 79 for use in determining movement of the sun tracker assembly 1.

FIG. 18 is an exemplary interface system 400 of the sun tracker assembly 1 (FIG. 1). The exemplary interface system 400 of the sun tracker assembly 1 comprises a microcontroller 96. The microcontroller 96 receives data from power regulators 98 and the keypad 97. Further, the microcontroller 97 transmits data to a liquid crystal display (LCD) and/or a wireless radio.

In one embodiment, the interface system 400 may be mounted to an inner wall of the vehicle on which the sun tracker assembly 1 is installed. In another embodiment, the interface system 400 is a hand-held device, e.g., a cellular phone or a tablet.

In operation, a user receives status of the sun tracker assembly 1 through the LCD display 95. Further, the user can control the sun tracker assembly 1 through providing inputs to the keypad 97.

The wireless radio 94 can transmit control data to the sun tracker assembly 1 wirelessly. The data transmitted can be used to control the sun tracker assembly's movement and sun tracking.

The power regulators 98 are electrically coupled to a replaceable battery 99. The replaceable battery 99 provides power to the user interface system 400 through the power regulators 98.

FIG. 19 a flowchart depicting exemplary architecture and functionality of the solar tracker assembly 1.

In step 100, hardware associated with the sun tracker assembly 1 is initialized. After initialization, the control logic 150 (FIG. 13) determines if the sun tracker assembly 1 should be deployed, i.e., raised and rotated. The control logic 150 makes this determination based upon data received from the sun tracker module 50 (FIG. 11), the GPS 40 (FIG. 12A) or other components. If the control logic 150 determines that the sun is not available, the control logic 150 returns the sun tracker assembly to its home position in step 107.

If the control logic 150 determines that there is available sun, the control logic 150 obtains data indicative of GPS, sensors, and the sun tracker. Based upon the data obtained, the control logic 150 determines whether it is night. If it is nighttime in step 103, the control logic 150 returns the sun tracker assembly 1 to its home position.

If it is not dark in step 103, the control logic 150 determines if there is excessive wind in step 104. If there is excessive wind, the control logic 150 returns the sun tracker assembly to its home position in step 107.

If the control logic determines that there is no excessive wind in step 104, the control logic determines if the vehicle is moving in step 105. If the vehicle is moving, the control logic 150 returns the sun tracker assembly to its home position in step 107.

If the vehicle is not moving in step 105, the control logic 150 initiates a home command in step 106.

Note that FIG. 14 shows a high-level flow chart of the control logic 150. It will initialize all hardware on power up as shown in Block 100. It will wait until the user issues permission to deploy on Block 101, although automatic control will be allowed with user intervention. When deployed, it will process the sensor data and control the actuators and pins to track the sun for the entire day until night occurs (Block 103), Excessive Winds are detected (Block 104), the vehicle is moving (Block 105), or the user commands it to return to the retracted or folded down Home Position (Block 106). If the Master Controller returns the unit to the home position, it will remain there until the user reactivates it in Block 101.

What I claim is:

1. A lightweight, portable solar tracker assembly, comprising:
   a bottom frame coupled to a rotation drive disc coupled to a rotational linear actuator;
   a middle frame rotatably coupled to the bottom frame via the rotation drive disc such that when activated, the middle frame rotates via the rotational linear actuator;
   a solar array mounting frame fixedly coupled to the middle frame and comprising a vertical linear actuator coupled to the middle frame such than when activated, the solar array mounting frame moves vertically, and when the middle frame rotates, the solar array mounting frame rotates;
   a vertical linear actuator coupled on one end to the middle of the middle frame and coupled on an opposing end to the middle of the solar array mounting frame such than when activated, the solar array mounting frame moves vertically;
   at least one solar cell fixedly coupled to the solar array mounting frame; and
   a processor configured to determine a position in a sky of a sun, the processor further configured to actuate the vertical linear actuator and the rotational linear actuator so that the at least one solar cell is aligned with the sun,
   wherein a top portion of a stabilizer frame comprising a top frame and the bottom frame, the top frame is hingedly coupled on a top side to a vertical and horizontal midpoint of the solar array mounting frame, and the top frame is hingedly coupled on a bottom side to a top side of the bottom frame, a bottom side of the bottom frame is hingedly coupled at a vertical and horizontal midpoint of the middle frame and a bottom portion of the stabilizer frame is coupled to the middle frame and wherein the upper portion of the stabilizer frame and the bottom portion of the stabilizer frame are coupled via a hinge such that when the vertical linear actuator is actuated, the hinges actuate accordingly.

2. The lightweight, portable sun tracker assembly of claim 1, wherein the bottom frame, the middle frame, and the solar array mounting frame are substantially rectangular.

3. The lightweight, portable sun tracker assembly of claim 1, wherein the bottom frame, the middle frame, and the solar array mounting frame are composed of a lightweight aluminum.

4. The lightweight, portable sun tracker assembly of claim 1, wherein the bottom frame, the middle frame, and the solar array mounting frame are composed of a lightweight metal.

5. The lightweight, portable sun tracker assembly of claim 1, further comprising an actuator pin coupled to a rotational actuator mounting place, wherein the rotation drive disc comprising a plurality of openings on the drive disc's outside edge.

6. The lightweight, portable sun tracker assembly of claim 5, wherein the processor is configured to rotate the rotation drive disc so that a pin aligns with one of the openings and engages the opening thereby rotating the middle frame and the solar array mounting frame.

7. The lightweight, portable sun tracker assembly of claim 1, further comprising an accelerometer and wherein the processor receives data from the accelerometer indicative of the angle of the sun tracker assembly.

8. The lightweight, portable sun tracker assembly of claim 7, wherein the processor is further configured to move the middle plate based upon the data from the accelerometer.

9. The lightweight, portable sun tracker assembly of claim 1, further comprising a magnetometer for determining a heading of the bottom frame of the sun tracker assembly.

10. The lightweight, portable sun tracker assembly of claim 1, wherein the processor is configured to receive data indicative of the heading of the sun tracker assembly and move the middle frame to achieve the greatest sunlight intensity.

11. The lightweight, portable sun tracker assembly of claim 1, wherein the bottom frame, the middle frame, and the solar array mounting frame collapse such that the bottom frame is parallel to the middle frame and the middle frame is parallel to the solar array mounting frame.

12. The lightweight, portable sun tracker assembly of claim 1, wherein the bottom frame is fixedly mounted to a top of a vehicle.

13. The lightweight, portable sun tracker assembly of claim 1, further comprising a magnetometer for determining a heading of the bottom frame of the sun tracker assembly.

14. The lightweight, portable sun tracker assembly of claim 1, wherein the vehicle is a recreational vehicle.

15. The lightweight, portable sun tracker assembly of claim 1, wherein the solar array frame comprises four rectangular openings configured for receiving four rectangular solar array panels.

16. The lightweight, portable sun tracker assembly of claim 1, wherein the four rectangular solar array panels are vertically separated by a vertical pane and horizontally separated by a horizontal pane.

17. The lightweight, portable sun tracker assembly of claim 16, wherein the top side of the top frame of the stabilizer frame is coupled to the horizontal pane.

18. The lightweight, portable sun tracker assembly of claim 1, further comprising a sun tracker module housed in an enclosure.

19. The lightweight, portable sun tracker assembly of claim 18, wherein within the enclosure are four sensors sensitive to sunlight, a top left sensor, a top right sensor, a bottom left sensor, and a bottom right sensor.

20. The lightweight, portable sun tracker assembly of claim 19, wherein the sensors are mounted in apertures.

21. The lightweight, portable sun tracker assembly of claim 20, wherein mounted over the sensors is a horizontal shade barrier and a vertical shade barrier that selectively block or expose energy from the sun to the sensors.

22. The lightweight, portable sun tracker assembly of claim 21, wherein the sensors output a signal indicative of the quantity of solar energy to which the sensors are exposed.

23. The lightweight, portable sun tracker assembly of claim 22, wherein the processor determines the position of the sun determined by the amount of energy detected by the sensors.

24. The lightweight, portable sun tracker assembly of claim 22, wherein the processor is configured to automatically un-deploy during night hours, during periods of high winds, and/or movement of a host vehicle to which the portable sun tracker assembly is coupled.

\* \* \* \* \*